(12) United States Patent
Jin et al.

(10) Patent No.: US 11,787,728 B2
(45) Date of Patent: Oct. 17, 2023

(54) SCRATCH RESISTANT GLASS AND METHOD OF MAKING

(71) Applicant: CORNING INCORPORATED, Corning, NY (US)

(72) Inventors: Yuhui Jin, Painted Post, NY (US); Joshua James McCaslin, Beaver Dams, NY (US); Vitor Marino Schneider, Painted Post, NY (US); Wei Sun, Painted Post, NY (US); Taylor Marie Wilkinson, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 558 days.

(21) Appl. No.: 17/005,769

(22) Filed: Aug. 28, 2020

(65) Prior Publication Data

US 2021/0061705 A1 Mar. 4, 2021

Related U.S. Application Data

(60) Provisional application No. 62/937,955, filed on Nov. 20, 2019, provisional application No. 62/894,288, filed on Aug. 30, 2019.

(51) Int. Cl.
| | |
|---|---|
| *B32B 15/04* | (2006.01) |
| *B32B 17/06* | (2006.01) |
| *C03C 3/093* | (2006.01) |
| *C03C 21/00* | (2006.01) |
| *C03C 4/18* | (2006.01) |
| *C03C 3/091* | (2006.01) |

(52) U.S. Cl.
CPC .............. *C03C 3/093* (2013.01); *C03C 3/091* (2013.01); *C03C 4/18* (2013.01); *C03C 21/002* (2013.01); *C03C 2204/00* (2013.01)

(58) Field of Classification Search
CPC .................................................... C03C 21/002
USPC .................................................. 428/410, 426
See application file for complete search history.

(56) References Cited

U.S. PATENT DOCUMENTS

| 8,312,739 B2 | 11/2012 | Lee et al. |
| 8,561,429 B2 | 10/2013 | Allan et al. |
| 8,586,492 B2 | 11/2013 | Barefoot et al. |

(Continued)

FOREIGN PATENT DOCUMENTS

CN 102815860 A 12/2012

OTHER PUBLICATIONS

Invitation to Pay Additional Fees of the International Searching Authority; PCT/US20/045864; dated Oct. 27, 2020; 4 Pages; Commissioner for Patents.

(Continued)

*Primary Examiner* — Lauren R Colgan
(74) *Attorney, Agent, or Firm* — Travis B. Gasa

(57) ABSTRACT

Glass-based articles comprise stress profiles providing improved scratch resistance. The glass-based articles comprise: a thickness t; a lithium aluminosilicate composition; and a molar ratio of sodium oxide ($Na_2O$) to lithium oxide ($Li_2O$) that is less than or equal to 0.63 at the center of the glass-based article. The articles have a molar ratio of sodium dioxide ($Na_2O$) to lithium dioxide ($Li_2O$) in a post-spike near region that is greater than or equal to 0.9 and/or less than 1.5.

19 Claims, 12 Drawing Sheets

(56) References Cited

U.S. PATENT DOCUMENTS

| | | | |
|---|---|---|---|
| 8,969,226 | B2 | 3/2015 | Dejneka et al. |
| 9,199,876 | B2 | 12/2015 | Wang et al. |
| 10,633,279 | B2 | 4/2020 | Gross et al. |
| 2011/0135963 | A1* | 6/2011 | Nagashima .............. C03C 3/085 428/836 |
| 2011/0151282 | A1* | 6/2011 | Nagashima ........ G11B 5/73921 428/800 |
| 2012/0052271 | A1* | 3/2012 | Gomez ................. C03C 21/002 65/30.14 |
| 2015/0030838 | A1 | 1/2015 | Sellier et al. |
| 2017/0082257 | A1 | 3/2017 | Yoon |
| 2017/0113967 | A1* | 4/2017 | Chapman ................. C03C 3/097 |
| 2017/0197384 | A1* | 7/2017 | Finkeldey ......... B32B 17/10045 |
| 2018/0147114 | A1* | 5/2018 | DeMartino ............ C03C 14/008 |
| 2018/0265397 | A1 | 9/2018 | Murayama et al. |
| 2019/0161386 | A1 | 5/2019 | Gross et al. |

OTHER PUBLICATIONS

Tandon et al., "Controlling the Fragmentation Behavior of Stressed Glass", In: Bradt R.C., Munz D., Sakai M., White K.W. (eds) Fracture Mechanics of Ceramics (Active Materials, Nanoscale Materials, Composites, Glass and Fundamentals), vol. 14, 2005, pp. 77-91.

International Search Report and Written Opinion of the International Searching Authority; PCT/US2020/045864; dated Jan. 12, 2021; 5 Pages; Commissioner for Patents.

* cited by examiner

SCRATCH RESISTANT GLASS AND METHOD OF MAKING

This application claims the benefit of priority of U.S. Provisional Application Ser. No. 62/937,955 filed on Nov. 20, 2019 and U.S. Provisional Application Ser. No. 62/894,288 filed on Aug. 30, 2019, the content of which is relied upon and incorporated herein by reference in its entirety.

BACKGROUND

Field

The present specification generally relates to a scratch-resistant glass. More particularly, the specification relates to a method of providing a glass with improved scratch resistance.

Technical Background

Ion exchangeable glasses are widely used as cover glasses and in the bodies of electronic devices. Although ion exchange provides enhanced surface strength to a glass, including improvement in hardness, the glass is still susceptible to scratches caused by exposure to materials that are harder than the glass.

Attempts to improve scratch or abrasion resistance typically include manipulating a composition of the glass itself to increase hardness, use of alternate materials, or applying hard coatings to the glass surface. For example, lithium-based glasses were developed, which improved mechanical performance. The Li-based glasses have been shown to have superior drop performance, which allows for these glasses to be dropped from higher and higher heights before failure (glass breaks/fracture) occurs. In order to improve scratch performance in conjunction with other mechanical performance, boron can be added to open the tightly packed network of the glass.

It has been a continuous effort for glass makers and handheld device manufacturers to improve scratch performance of handheld devices.

Accordingly, a need exists for glasses that can be strengthened, such as by ion exchange, and that have the mechanical properties that allow them to be formed as scratch resistant glass articles.

SUMMARY

Aspects of the disclosure pertain to glass-based articles and methods for their manufacture.

In an aspect, a glass-based article comprises: a lithium aluminosilicate composition; a molar ratio of sodium oxide ($Na_2O$) to lithium oxide ($Li_2O$) that is less than or equal to 0.9 at the center of the glass-based article; a thickness t; and a stress profile comprising: a spike region extending from the first surface to a knee at a spike depth of layer ($DOL_{spike}$); and a tail region extending from the knee to a center of the glass-based article, wherein within the tail region there is a post-spike near region; wherein a molar ratio of sodium dioxide ($Na_2O$) to lithium dioxide ($Li_2O$) in the post-spike near region is greater than or equal to 0.9.

In an aspect, a glass-based article comprises: a lithium aluminosilicate composition, wherein at the center of the glass-based article, a molar ratio of sodium oxide ($Na_2O$) to lithium oxide ($Li_2O$) is less than 0.9; a thickness t; a molar ratio of sodium dioxide ($Na_2O$) to lithium dioxide ($Li_2O$) averaged over a distance from a depth of the glass-based article of 0.5 micrometers to a depth of 1 micrometers that is greater than or equal to 0.9 and less than 1.5; and a stress profile comprising: a maximum compressive stress ($CS_{max}$) greater than or equal to 650 MPa; a depth of compression (DOC) that is greater than or equal to 0.191; and a peak central tension (CT) in a tensile region that is less than or equal to: $(E/68\ GPa)*75\ MPa*1\ mm^{0.5}/\sqrt{(t)}$, where E is Young's modulus value of the glass-based article; and a Knoop scratch initiation threshold of greater than or equal to 5 N.

In an aspect, a glass-based article comprises: a lithium aluminosilicate composition, wherein at the center of the glass-based article, a molar ratio of sodium oxide ($Na_2O$) to lithium oxide ($Li_2O$) is less than 0.9; a thickness t; a molar ratio of sodium dioxide ($Na_2O$) to lithium dioxide ($Li_2O$) averaged over a distance from a depth of the glass-based article of 0.5 micrometers to a depth of 1 micrometers that is greater than or equal to 0.9 and less than 1.5; and a stress profile comprising: a maximum compressive stress ($CS_{max}$) greater than or equal to 650 MPa; a depth of compression (DOC) that is greater than or equal to 0.19·t; and a peak central tension (CT) in a tensile region that is greater than: $(E/68\ GPa)*75\ MPa*1\ mm^{0.5}/\sqrt{(t)}$, where E is Young's modulus value of the glass-based article; and a Knoop scratch initiation threshold of greater than or equal to 5 N.

In an aspect, a glass-based article comprises: a lithium aluminosilicate composition; a molar ratio of sodium oxide ($Na_2O$) to lithium oxide ($Li_2O$) that is less than or equal to 0.9 at the center of the glass-based article; a thickness t; and a stress profile comprising: a spike region extending from the first surface to a knee at a spike depth of layer ($DOL_{spike}$); and a tail region extending from the knee to a center of the glass-based article; wherein for a portion of the spike region, a concentration of the lithium exceeds a concentration of the sodium.

In an aspect, a consumer electronic product comprises: a housing having a front surface, a back surface, and side surfaces; electrical components provided at least partially within the housing, the electrical components including at least a controller, a memory, and a display, the display being provided at or adjacent the front surface of the housing; and a cover disposed over the display; wherein a portion of at least one of the housing and the cover comprises the glass-based article of any aspect or embodiment herein.

In an aspect, a method of manufacturing a glass-based article comprises: exposing a glass-based substrate having opposing first and second surfaces defining a substrate thickness (t) and having a lithium aluminosilicate composition to an ion exchange treatment to form the glass-based article having a stress profile comprising: a spike region extending from the first surface to a knee at a spike depth of layer ($DOL_{spike}$); and a tail region extending from the knee to a center of the glass-based article, wherein within the tail region there is a post-spike near region, the ion exchange treatment comprising: a first molten salt bath comprising a potassium salt, a sodium salt, and a lithium salt, wherein a concentration of the lithium salt is in the range of greater than or equal to 15 weight % to less than or equal to 50 weight %; and a second molten salt bath comprising a potassium salt, a sodium salt, and a lithium salt, wherein a concentration of the lithium salt is in the range of greater than or equal to 0 weight % to less than or equal to 1 weight %; wherein the glass-based substrate comprises a molar ratio of sodium oxide ($Na_2O$) to lithium oxide ($Li_2O$) that is less than or equal to 0.63; and wherein the glass-based article comprises a molar ratio of sodium dioxide ($Na_2O$) to lithium dioxide ($Li_2O$) in the post-spike near region is greater than or equal to 0.9.

In a detailed aspect, the method of any of aspect or embodiment herein comprises: in the first molten salt bath, a concentration of the potassium salt in the range of greater than or equal to 30 weight % to less than or equal to 40 weight %, a concentration of the sodium salt in the range of greater than or equal to 30 weight % to less than or equal to 40 weight %, and the concentration of the lithium salt is in the range of greater than or equal to 25 weight % to less than or equal to 35 weight %, with the proviso that the concentrations of the potassium salt, the sodium salt, and the lithium salt in the first molten bath total 100%; and in the second molten salt bath, a concentration of the potassium salt in the range of greater than or equal to 95 weight % to less than or equal to 99 weight %, a concentration of the sodium salt in the range of greater than or equal to 0 weight % to less than or equal to 5 weight %, and the concentration of the lithium salt is in the range of greater than or equal to 0.1 weight % to less than or equal to 1 weight %, with the proviso that the concentrations of the potassium salt, the sodium salt, and the lithium salt in the second molten bath total 100%.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The accompanying figures, which are incorporated in and constitute a part of this specification, illustrate several embodiments described below.

DETAILED DESCRIPTION

Figure 1:
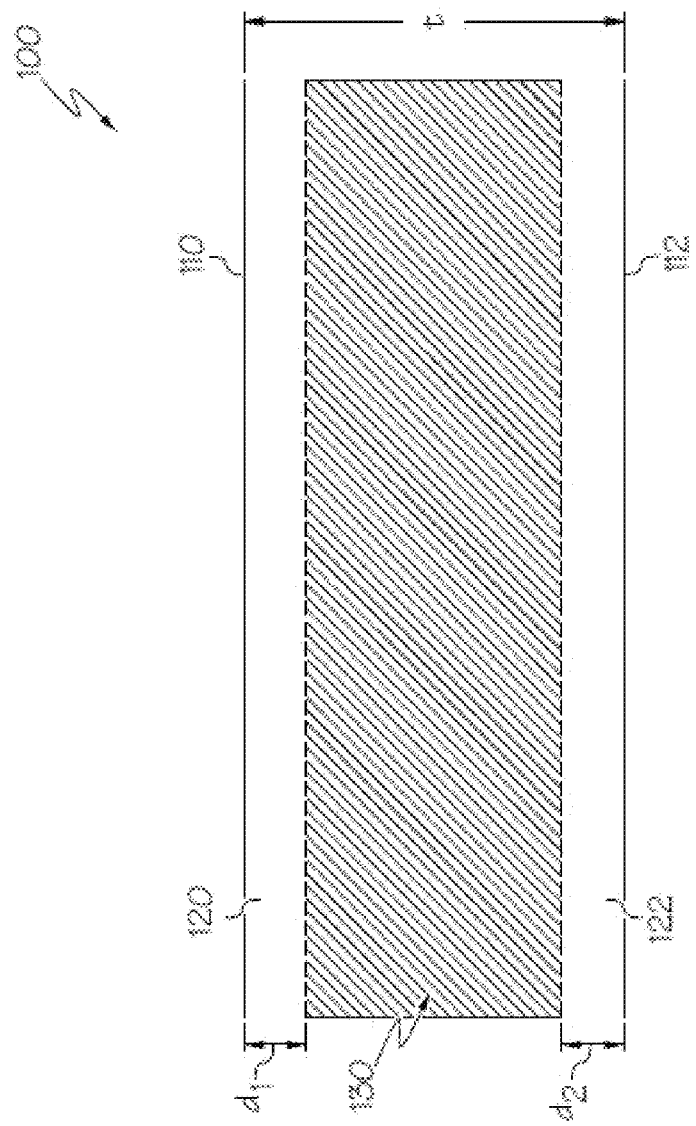
FIG. 1 schematically depicts a cross-section of a glass having compressive stress layers on surfaces thereof according to embodiments disclosed and described herein.

Before describing several exemplary embodiments, it is to be understood that the disclosure is not limited to the details of construction or process steps set forth in the following disclosure. The disclosure provided herein is capable of other embodiments and of being practiced or being carried out in various ways.

Reference throughout this specification to "one embodiment," "certain embodiments," "various embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in various embodiments," "in one embodiment" or "in an embodiment" in various places throughout this specification are not necessarily referring to the same embodiment, or to only one embodiment. Furthermore, the particular features, structures, materials, or characteristics may be combined in any suitable manner in one or more embodiments.

Definitions and Measurement Techniques

The terms "glass-based article" and "glass-based substrates" are used to include any object made wholly or partly of glass, such as glass or glass-ceramic materials. Laminated glass-based articles include laminates of glass and non-glass materials, laminates of glass and crystalline materials. Glass-based substrates according to one or more embodiments can be selected from soda-lime silicate glass, alkali-alumino silicate glass, alkali-containing borosilicate glass, and alkali-containing aluminoborosilicate glass.

A "base composition" is a chemical make-up of a substrate prior to any ion exchange (IOX) treatment. That is, the base composition is undoped by any ions from IOX. A composition at the center of a glass-based article that has been IOX treated is typically the same as the base composition when IOX treatment conditions are such that ions supplied for IOX do not diffuse into the center of the substrate. In one or more embodiments, a central composition at the center of the glass article comprises the base composition.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, for example, a glass-based article that is "substantially free of MgO" is one in which MgO is not actively added or batched into the glass-based article, but may be present in very small amounts as a contaminant. As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

Unless otherwise specified, all compositions described herein are expressed in terms of mole percent (mol %) on an oxide basis.

A "stress profile" is stress as a function of thickness across a glass-based article. A compressive stress region extends from a first surface to a depth of compression (DOC) of the article, and is a region where the article is under compressive stress. A central tension region extends from the DOC to include the region where the article is under tensile stress.

As used herein, depth of compression (DOC) refers to the depth at which the stress within the glass-based article changes from compressive to tensile stress. At the DOC, the stress crosses from a positive (compressive) stress to a negative (tensile) stress and thus exhibits a stress value of zero. According to the convention normally used in mechanical arts, compression is expressed as a negative (<0) stress and tension is expressed as a positive (>0) stress. Throughout this description, however, positive values of stress are compressive stress (CS), which are expressed as a positive or absolute value—i.e., as recited herein, CS=|CS|. Additionally, negative values of stress are tensile stress. But when used with the term "tensile", stress or central tension (CT) may be expressed as a positive value, i.e., CT=|CT|. Central tension (CT) refers to tensile stress in a central region or a central tension region of the glass-based article. Maximum central tension (maximum CT or $CT_{max}$) may occur in the central tension region, such as nominally at 0.5·t, where t is the article thickness, which allows for variation from exact center of the location of the maximum tensile stress. Peak tension (PT) refers to maximum tension measured, which may or may not be at the center of the article.

A "knee" of a stress profile is a depth of an article where the slope of the stress profile transitions from steep to gradual. The knee may refer to a transition area over a span of depths where the slope is changing. The knee stress $CS_k$ is defined as the value of compressive stress that the deeper portion of the CS profile extrapolates to at the depth of spike ($DOL_k$). The $DOL_k$ is reported as measured by a surface-stress meter by known methods. A schematic representation of a stress profile including a knee stress is provided in FIG. 2.

A non-zero metal oxide concentration that varies from the first surface to a depth of layer (DOL) with respect to the metal oxide or that varies along at least a substantial portion of the article thickness (t) indicates that a stress has been generated in the article as a result of ion exchange. The variation in metal oxide concentration may be referred to herein as a metal oxide concentration gradient. The metal oxide that is non-zero in concentration and varies from the first surface to a DOL or along a portion of the thickness may be described as generating a stress in the glass-based article. The concentration gradient or variation of metal oxides is created by chemically strengthening a glass-based substrate in which a plurality of first metal ions in the glass-based substrate is exchanged with a plurality of second metal ions.

As used herein, the terms "depth of exchange", "depth of layer" (DOL), "chemical depth of layer", and "depth of chemical layer" may be used interchangeably, describing in general the depth at which ion exchange facilitated by an ion exchange process (IOX) takes place for a particular ion. DOL refers to the depth within a glass-based article (i.e., the distance from a surface of the glass-based article to its interior region) at which an ion of a metal oxide or alkali metal oxide (e.g., the metal ion or alkali metal ion) diffuses into the glass-based article where the concentration of the ion reaches a minimum value, as determined by Glow Discharge-Optical Emission Spectroscopy (GD-OES)). In some embodiments, the DOL is given as the depth of exchange of the slowest-diffusing or largest ion introduced by an ion exchange (IOX) process. DOL with respect to potassium ($DOL_K$) is the depth at which the potassium content of the glass article reaches the potassium content of the underlying substrate. DOL with respect to sodium ($DOL_{Na}$) is the depth at which the sodium content of the glass article reaches the sodium content of the underlying substrate.

Unless otherwise specified, CT and CS are expressed herein in megaPascals (MPa), thickness is express in millimeters and DOC and DOL are expressed in microns (micrometers).

Compressive stress (including surface/peak CS, $CS_{max}$) and $DOL_{sp}$ are measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety.

The maximum central tension (CT) or peak tension (PT) and stress retention values are measured using a scattered light polariscope (SCALP) technique known in the art. The Refracted near-field (RNF) method or SCALP may be used to measure the stress profile and the depth of compression (DOC). When the RNF method is utilized to measure the stress profile, the maximum CT value provided by SCALP is utilized in the RNF method. In particular, the stress profile measured by RNF is force balanced and calibrated to the maximum CT value provided by a SCALP measurement. The RNF method is described in U.S. Pat. No. 8,854,623, entitled "Systems and methods for measuring a profile characteristic of a glass sample", which is incorporated herein by reference in its entirety. In particular, the RNF method includes placing the glass article adjacent to a reference block, generating a polarization-switched light beam that is switched between orthogonal polarizations at a rate of from 1 Hz to 50 Hz, measuring an amount of power in the polarization-switched light beam and generating a polarization-switched reference signal, wherein the measured amounts of power in each of the orthogonal polarizations are within 50% of each other. The method further includes transmitting the polarization-switched light beam through the glass sample and reference block for different depths into the glass sample, then relaying the transmitted polarization-switched light beam to a signal photodetector using a relay optical system, with the signal photodetector generating a polarization-switched detector signal. The method also includes dividing the detector signal by the reference signal to form a normalized detector signal and determining the profile characteristic of the glass sample from the normalized detector signal.

General Overview of Properties of Glass-Based Articles

Glass-based articles herein are designed to have improved scratch resistance for high damage resistant glasses. The articles herein have stress profiles that include a spike region extending from a surface of the article to a knee, and a tail region extending from the knee to a center of the article. In the tail region, there is a post-spike near region of interest as well as an area of negative curvature. Unique glass-based articles after ion exchange include a desired sodium dioxide-lithium dioxide molar ratio in the post-spike region and/or in a region below the surface, e.g., from 0.5 micrometers to 1 micrometer.

Reference to "post-spike near region" is an area of the stress profile that is deeper than the knee and is before the area of negative curvature. In one or more embodiments, the post-spike region is a position deeper than the knee that extends into the depth over a distance that is from 20% to 100%, and all values therebetween, of the spike depth ($DOL_{spike}$). Evaluating a sodium dioxide-lithium dioxide molar ratio in the post-spike region may be done, in one or more embodiments, by averaging the ratio over a distance that deeper than the knee by from 20 to 100% of the spike depth. For example, for a spike/knee located at 5 micrometers, the sodium dioxide-lithium dioxide molar ratio would be averaged over a depth of greater than or equal to 6 to less than or equal to 10 microns.

Stress profiles of the articles herein allow for high maximum compressive stress ($CS_{max}$) while providing scratch resistance.

As lithium (Li)-content is increased in base glass compositions, to improve, for example, damage resistance, stress profiles with high surface stress (CS) can lead to poor scratch resistance. Even the presence of boron (B) in some compositions does not preclude poor scratch resistance. That is, for example, a traditional ion exchange to achieve high stress in the surface, e.g. >700 MPa, scratch performance is poor for a glass having a sodium-potassium molar ratio at a center of the article of 0.63 and a boron content in the range of 1.5 mol % to 7.0 mol %. Processes herein allow for the formation of a stress profile in this type of glass with a high amount of Li in its base composition (e.g., sodium-potassium molar ratio at a center of the article of less than 0.9) that can simultaneously achieve high $CS_{max}$, good drop performance, and good scratch performance.

The methods described herein are advantageous in that by using a specific first bath condition (high lithium concentration compared to traditional baths) prior to a second traditional bath (low to no lithium) for imparting a spike, the resulting stress profile results in a glass with improved scratch performance as well as good drop performance. With specific regard to glasses having an amount of Li that is higher than an amount of Na in in the base composition, without intending to be bound by theory, it is thought that the use of such a heavily doped Li glass has the overall effect of allowing slow diffusion of K and Na in the substrate in the first step while still maintaining a significant amount of Li inside the glass. This process allow for increased scratch resistance achieved through ion exchange as opposed to composition changes seen with boron addition. Ultimately, a user may increase or decrease scratch performance of a glass through ion exchange methods. Methods herein also maximize central tension (CT) while achieving high surface compressive stress (CS). Lifetimes of high lithium content salt baths (first IOX step) are semi-infinite. Adding a small amount of Li (e.g., 0.7 wt. %) to the second bath (second IOX step) can minimize a sharp deviation in compressive stress throughout lifetime of the second bath in the first one to two runs as compared to a bath of pure K/Na. In the second bath, the K leads to a high CS at the surface and a small amount of Na is diffused into the glass, which allows for a large stress in the surface in a controllable way.

Advantages herein include but are not limited to the following. The methods and resulting stress profiles allow for the creation of stress profiles with high $CS_{max}$ (e.g., greater than or equal to 650 MPa) and simultaneous good scratch performance when tested with a diamond indenter tip. The high $CS_{max}$ in the surface is a desirable attribute that usually also corresponds to a good damage and scratch resistance, and minimization of flaws due to part finishing at the manufacturer. The articles herein also present simultaneously high impact resistance as tested by drop performance tests. The methods use two separate ion exchange (IOX) baths in a dual ion exchange (DIOX) process. The first step IOX bath has essentially a semi-infinite lifetime. The second step IOX bath has similar bath lifetime as current processes making the process cost effective. Scratch performance on a Knoop diamond indenter tip shows that the articles herein provide superior scratch performance as compared to a previous generation glass, in particular for tests with a load of 8N.

For exchange of one ion into a glass, for example exchange of potassium for sodium in a non-lithium glass, the stress profile is typically a complementary error function if the ions do not diffuse to the center of the sample, because the diffusion of the ion typically follows a complementary error function for such circumstances. If the ions diffuse to the center of sample (half-thickness) or past the center of the sample, the overall ion distribution resembles a parabola. Therefore, the stress profile will resemble a parabola in this case. For some glasses, upon exposure to longer durations of diffusion alone or in combination with higher temperature, regardless of whether the ions diffuse to the center or not and regardless of whether the stress profile looks like an complementary error function or a parabola, non-linear diffusion can occur, which results in stress relaxation and a corresponding stress profile that is distorted relative to either a complementary error function or a parabola. In this case, the complementary error function or the parabola is distorted to resemble an S-shaped stress profile. The glasses herein can have either a complementary error function, parabolic profile, or an S-shaped profile in combination with high surface compressive stress. DOC can be greater than or equal to 0.19·t, which for the S-shaped profiles is due at least in part to stress relaxation.

Reference will now be made in detail to lithium aluminosilicate glasses and scratch resistance according to various embodiments. Alkali aluminosilicate glasses have good ion exchangeability, and chemical strengthening processes have been used to achieve high strength and high toughness properties in alkali aluminosilicate glasses. Sodium aluminosilicate glasses are highly ion exchangeable glasses with high glass formability and quality. Lithium aluminosilicate glasses are highly ion exchangeable glasses with high glass quality. The substitution of $Al_2O_3$ into the silicate glass network increases the interdiffusivity of monovalent cations during ion exchange. By chemical strengthening in a molten salt bath (e.g., $KNO_3$ or $NaNO_3$), glasses with high strength, high toughness, and high indentation cracking resistance can be achieved. The stress profiles achieved through chemical strengthening may have a variety of shapes that increase the drop performance, strength, toughness, and other attributes of the glass articles, as well as improved scratch resistance.

Therefore, lithium aluminosilicate glasses with good physical properties, chemical durability, and ion exchangeability have drawn attention for use as cover glass. Through different ion exchange processes, greater central tension (CT), depth of compression (DOC), and compressive stress (CS) can be achieved. The stress profiles described herein provide increased fracture resistance for lithium containing glass articles.

In embodiments of glass compositions described herein, the concentration of constituent components (e.g., $SiO_2$, $Al_2O_3$, $Li_2O$, and the like) are given in mole percent (mol %) on an oxide basis, unless otherwise specified. It should be understood that any of the variously recited ranges of one component may be individually combined with any of the variously recited ranges for any other component.

Disclosed herein are ion exchange methods and stress profiles for lithium aluminosilicate glass compositions. The stress profiles exhibit scratch resistance. With reference to FIG. 1, the glass has a thickness t and a first region under compressive stress (e.g., first and second compressive stress layers 120, 122 in FIG. 1) extending from the surface to a depth of compression (DOC) of the glass and a second region (e.g., central region 130 in FIG. 1) under a tensile stress or central tension (CT) extending from the DOC into the central or interior region of the glass.

The compressive stress (CS) has a maximum or peak value, which typically occurs at the surface of the glass (but such need not be the case as the peak may occur at a depth from the surface of the glass), and the CS varies with distance d from the surface according to a function. Referring again to FIG. 1, the first compressive stress layer 120 extends from first surface 110 to a depth $d_1$ and the second compressive stress layer 122 extends from second surface 112 to a depth $d_2$. Together, these segments define a compression or CS of glass 100.

The compressive stress of both compressive stress layers (120, 122 in FIG. 1) is balanced by stored tension in the central region (130) of the glass.

Figure 2:
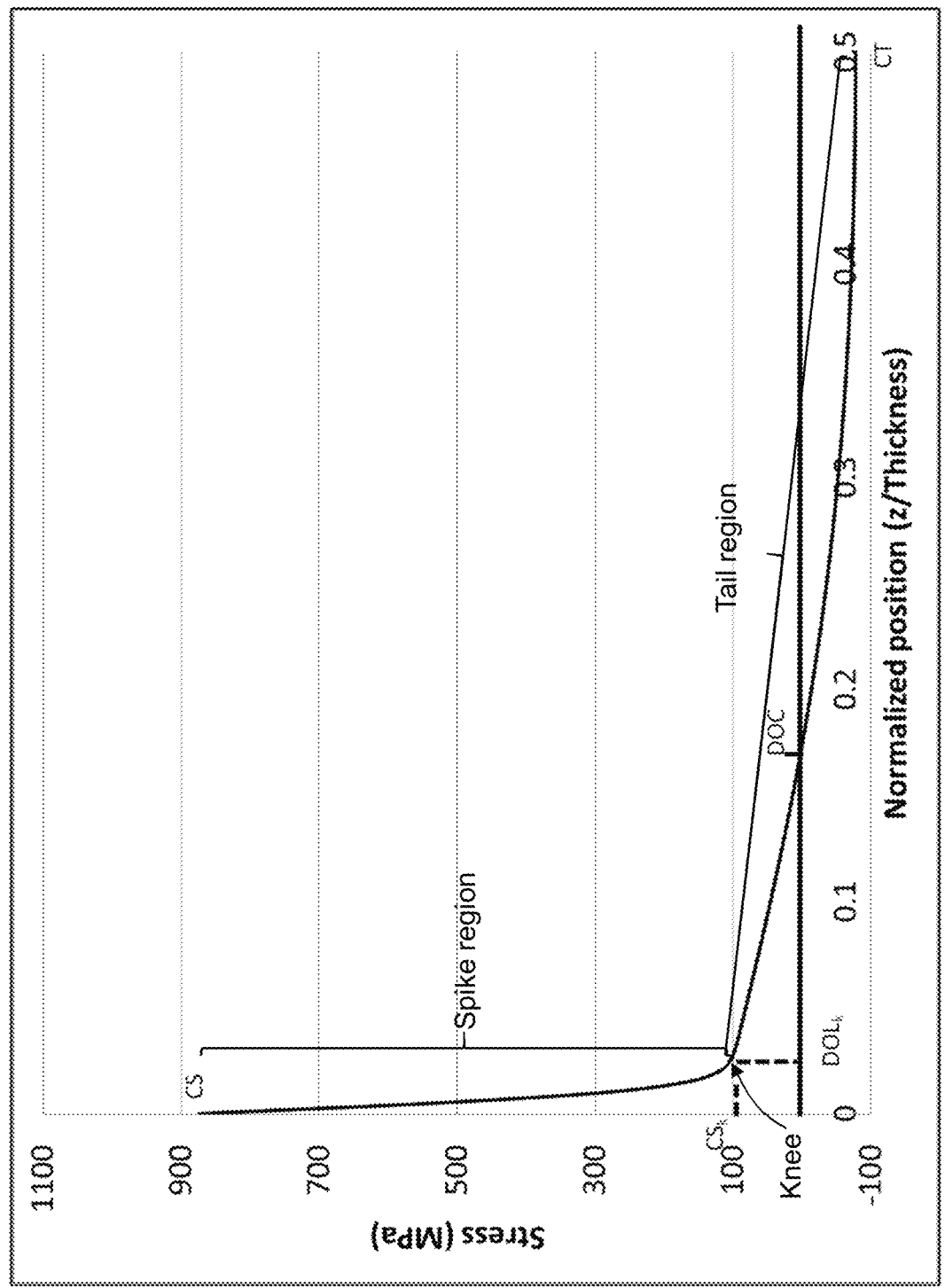
FIG. 2 is a schematic representation of a stress profile including a knee stress.

FIG. 2 shows a schematic of a conventional stress profile containing a spike region near the surface extending to a knee, and a tail region extending from the knee to deeper in the glass towards the center. The stress profile comprises: a compressive stress at the surface CS, a depth of layer ($DOL_k$) of the spike region that is related to the diffusion depth of the ions near the spike, stress of the knee $CS_k$, which is the stress at the asymptotic extrapolation of the spike and deep profile regions, a depth of compression (DOC), which is the location where the stress is first zero inside the glass and changes sign from compression to tension, and a central tension (CT) that is the stress at the center of the glass. In FIG. 2, the convention is that compressive stress is positive and tension is negative for illustration purposes.

In the glass-based articles, there is an alkali metal oxide having a non-zero concentration that varies from one or both of first and second surfaces to a depth of layer (DOL) with respect to the metal oxide. A stress profile is generated due to the non-zero concentration of the metal oxide(s) that varies from the first surface. The non-zero concentration may vary along a portion of the article thickness. In some embodiments, the concentration of the alkali metal oxide is non-zero and varies along a thickness range from about 0·t to about 0.3·t. In some embodiments, the concentration of the alkali metal oxide is non-zero and varies along a thickness range from about 0·t to about 0.35·t, from about 0·t to about 0.4·t, from about 0·t to about 0.45·t, from about 0·t to about 0.48·t, or from about 0·t to about 0.50·t. The variation in concentration may be continuous along the above-referenced thickness ranges. Variation in concentration may include a change in metal oxide concentration of about 0.2 mol % or more along a thickness segment of about 100 micrometers. The change in metal oxide concentration may be about 0.3 mol % or more, about 0.4 mol % or more, or about 0.5 mol % or more along a thickness segment of about 100 micrometers. This change may be measured by known methods in the art including microprobe.

In some embodiments, the variation in concentration may be continuous along thickness segments in the range from about 10 micrometers to about 30 micrometers. In some embodiments, the concentration of the alkali metal oxide decreases from the first surface to a value between the first surface and the second surface and increases from the value to the second surface.

The concentration of alkali metal oxide may include more than one metal oxide (e.g., a combination of $Na_2O$ and $K_2O$). In some embodiments, where two metal oxides are utilized and where the radius of the ions differ from one or another, the concentration of ions having a larger radius is greater than the concentration of ions having a smaller radius at shallow depths, while at deeper depths, the concentration of ions having a smaller radius is greater than the concentration of ions having a larger radius.

In one or more embodiments, the alkali metal oxide concentration gradient extends through a substantial portion of the thickness t of the article. In some embodiments, the concentration of the metal oxide may be about 0.5 mol % or greater (e.g., about 1 mol % or greater) along the entire thickness of the first and/or second section, and is greatest at a first surface and/or a second surface 0·t and decreases substantially constantly to a value between the first and second surfaces. At that value, the concentration of the metal oxide is the least along the entire thickness t; however the concentration is also non-zero at that point. In other words, the non-zero concentration of that particular metal oxide extends along a substantial portion of the thickness t (as described herein) or the entire thickness t. The total concentration of the particular metal oxide in the glass-based article may be in the range from about 1 mol % to about 20 mol %.

The concentration of the alkali metal oxide may be determined from a baseline amount of the metal oxide in the glass-based substrate ion exchanged to form the glass-based article.

In one or more embodiments, the glass-based article comprises: a molar ratio of sodium dioxide ($Na_2O$) to lithium dioxide ($Li_2O$) in a post-spike near region greater than or equal to 0.9 and/or less than or equal to 1.5, or greater than or equal to 0.95, greater than or equal to 1.0, greater than or equal to 1.1, greater than or equal to 1.2, greater than or equal to 1.3, greater than or equal to 1.4; and/or less than or equal to 1.45; and all values and subranges therebetween. These $Na_2O$ to $Li_2O$ molar ratios contribute, at least in part, to the improved scratch resistance of the glass-based articles described herein.

In one or more embodiments, the glass-based article comprises: a spike depth of layer ($DOL_{spike}$) that is greater than or equal to 4 micrometers, greater than or equal to 4.5 micrometers, greater than or equal to 5 micrometers, greater than or equal to 5.5 micrometers, greater than or equal to 6 micrometers, greater than or equal to 6.5 micrometers, greater than or equal to 7 micrometers; and/or less than or equal to 8 micrometers, less than or equal to 7.5 micrometers, less than or equal to 7 micrometers, including all values and subranges therebetween.

In one or more embodiments, the glass-based article comprises: a potassium depth of layer ($DOL_K$) that is greater than or equal to 4 micrometers, greater than or equal to 4.5 micrometers, greater than or equal to 5 micrometers, greater than or equal to 5.5 micrometers, greater than or equal to 6 micrometers, greater than or equal to 6.5 micrometers, greater than or equal to 7 micrometers; and/or less than or equal to 8 micrometers, less than or equal to 7.5 micrometers, less than or equal to 7 micrometers, including all values and subranges therebetween.

In one or more embodiments, the glass-based article comprises: a compressive stress at a knee ($CS_k$) that is greater than or equal to 115 MPa, greater than or equal to 120 MPa, greater than or equal to 125 MPa, greater than or equal to 130 MPa, greater than or equal to 135 MPa, greater than or equal to 140 MPa, greater than or equal to 145 MPa, greater than or equal to 150 MPa, greater than or equal to 155 MPa, greater than or equal to 160 MPa, greater than or equal to 165 MPa, greater than or equal to 170 MPa, including all values and subranges therebetween.

In one or more embodiments, the glass-based article comprises: a depth of compression (DOC) that is greater than or equal to 0.19t, greater than or equal to 0.20t, greater than or equal to 0.21t, greater than or equal to 0.22t, greater than or equal to 0.23t, greater than or equal to 0.24t, greater than or equal to 0.25t, and/or less than or equal to 0.30t, less than or equal to 0.29t, less than or equal to 0.28t, less than or equal to 0.27t, less than or equal to 0.26t, less than or equal to 0.25t, less than or equal to 0.24t, less than or equal to 0.23t, including all values and subranges therebetween.

In one or more embodiments, the glass-based article comprises: a depth of compression (DOC) that is greater than or equal to 150 micrometers, greater than or equal to 155 micrometers, greater than or equal to 160 micrometers, greater than or equal to 165 micrometers, greater than or equal to 170 micrometers, including all values and subranges therebetween.

In one or more embodiments, the glass-based article comprises: t in the range of 0.5 mm to 0.8 mm, and all values and subranges therebetween; and/or t may be 0.8 mm or less, 0.75 mm or less, 0.73 mm or less, 0.70 mm or less, 0.65 mm or less, 0.6 mm or less, 0.55 mm or less, 0.4 mm or less, 0.3 mm or less, or 0.2 mm or less and/or greater than or equal to 0.1 mm, including all values and subranges therebetween.

In one or more embodiments, the glass-based article comprises: a maximum compressive stress ($CS_{max}$) that is greater than or equal to 500 MPa, greater than or equal to 550 MPa, greater than or equal to 600 MPa, greater than or equal to 650 MPa, greater than or equal to 700 MPa, greater than or equal to 750 MPa, greater than or equal to 800 MPa, greater than or equal to 850 MPa, greater than or equal to 900 MPa, greater than or equal to 950 MPa, greater than or equal to 1000 MPa, greater than or equal to 1050 MPa, greater than or equal to 1100 MPa, greater than or equal to 1150 MPa, or greater than or equal to 1200 MPa, including all values and subranges therebetween.

In one or more embodiments, the glass-based article comprises at its center: a sodium oxide ($Na_2O$) to lithium oxide ($Li_2O$) that is less than or equal to 0.9 and/or greater than or equal to 0.1, including less than or equal to 0.7, less than or equal to 0.3, and all values and subranges therebetween.

Glass-Based Substrates

Examples materials that may be used to form the glass-based substrates include glass and glass-ceramic materials. Exemplary glasses that may be used as substrates may include alkali-alumino silicate glass compositions or alkali-containing aluminoborosilicate glass compositions, though other glass compositions are contemplated. Specific examples of glass-based substrates that may be used include but are not limited to an alkali-alumino silicate glass, an alkali-containing borosilicate glass, an alkali-alumino borosilicate glass, an alkali-containing lithium alumino silicate glass, or an alkali-containing phosphate glass. The glass-based substrates have base compositions that may be characterized as ion exchangeable. As used herein, "ion exchangeable" means that a substrate comprising the composition is capable of exchanging cations located at or near the surface of the substrate with cations of the same valence that are either larger or smaller in size.

In one or more embodiments, glass-based substrates may include a lithium-containing aluminosilicate.

In embodiments, the glass-based substrates may be formed from any composition capable of forming the stress profiles. In some embodiments, the glass-based substrates may be formed from the glass compositions described in U.S. application Ser. No. 16/202,691 titled "Glasses with Low Excess Modifier Content," filed Nov. 28, 2018, the entirety of which is incorporated herein by reference. In some embodiments, the glass articles may be formed from the glass compositions described in U.S. application Ser. No. 16/202,767 titled "Ion-Exchangeable Mixed Alkali Aluminosilicate Glasses," filed Nov. 28, 2018, the entirety of which is incorporated herein by reference.

The glass-based substrates may be characterized by the manner in which it may be formed. For instance, the glass-based substrates may be characterized as float-formable (i.e., formed by a float process), down-drawable and, in particular, fusion-formable or slot-drawable (i.e., formed by a down draw process such as a fusion draw process or a slot draw process). In embodiments, the glass-based substrates may be roll formed.

Some embodiments of the glass-based substrates described herein may be formed by a down-draw process. Down-draw processes produce glass-based substrates having a uniform thickness that possess relatively pristine surfaces. Because the average flexural strength of the glass article is controlled by the amount and size of surface flaws, a pristine surface that has had minimal contact has a higher initial strength. In addition, down drawn glass articles have a very flat, smooth surface that can be used in its final application without costly grinding and polishing.

Some embodiments of the glass-based substrates may be described as fusion-formable (i.e., formable using a fusion draw process). The fusion process uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing glass article. The fusion draw method offers the advantage that, because the two glass films flowing over the channel fuse together, neither of the outside surfaces of the resulting glass article comes in contact with any part of the apparatus. Thus, the surface properties of the fusion drawn glass article are not affected by such contact.

Some embodiments of the glass-based substrates described herein may be formed by a slot draw process. The slot draw process is distinct from the fusion draw method. In slot draw processes, the molten raw material glass is provided to a drawing tank. The bottom of the drawing tank has an open slot with a nozzle that extends the length of the slot. The molten glass flows through the slot/nozzle and is drawn downward as a continuous glass article and into an annealing region.

In an embodiment, a base composition comprises: 9-25 mol % alumina ($Al_2O_3$), 0.1-20 mol % sodium oxide ($Na_2O$), and up to 9 mol % boron oxide ($B_2O_3$), and at least one alkaline earth metal oxide, wherein 15 mol %≤($R_2O$+ R'O—$Al_2O_3$—$ZrO_2$)—$B_2O_3$≤2 mol %, where R is Na and optionally one or more of Li, K, Rb, and Cs, and R' is one or more of Mg, Ca, Sr, and Ba.

In one or more embodiments, the glass-based substrates described herein may exhibit an amorphous microstructure and may be substantially free of crystals or crystallites. In other words, the glass-base substrates articles exclude glass-ceramic materials in some embodiments.

Ion Exchange (IOX) Treatment

Chemical strengthening of glass-based substrates having base compositions is done by placing the ion-exchangeable glass-based substrates to an ion exchange medium. In embodiments, the ion exchange medium may be a molten bath containing cations (e.g., K+, Na+, Ag+, etc) that diffuse into the glass while the smaller alkali ions (e.g., Na+, Li+) of the glass diffuse out into the molten bath. The replacement of the smaller cations by larger ones creates compressive stresses near the surface of glass. Tensile stresses are generated in the interior of the glass to balance the near-surface compressive stresses.

With respect to ion exchange processes, they may independently be a thermal-diffusion process or an electro-diffusion process. Non-limiting examples of ion exchange processes in which glass is immersed in multiple ion exchange baths, with washing and/or annealing steps between immersions, are described in U.S. Pat. No. 8,561, 429, by Douglas C. Allan et al., issued on Oct. 22, 2013, entitled "Glass with Compressive Surface for Consumer Applications," and claiming priority from U.S. Provisional Patent Application No. 61/079,995, filed Jul. 11, 2008, in which glass is strengthened by immersion in multiple, successive, ion exchange treatments in salt baths of different concentrations; and U.S. Pat. No. 8,312,739, by Christopher M. Lee et al., issued on Nov. 20, 2012, and entitled "Dual Stage Ion Exchange for Chemical Strengthening of Glass," and claiming priority from U.S. Provisional Patent Application No. 61/084,398, filed Jul. 29, 2008, in which glass is strengthened by ion exchange in a first bath is diluted with an effluent ion, followed by immersion in a second bath having a smaller concentration of the effluent ion than the first bath. The contents of U.S. Pat. Nos. 8,561,429 and 8,312,739 are incorporated herein by reference in their entireties.

After an ion exchange process is performed, it should be understood that a composition at the surface of a glass article may be different than the composition of the as-formed glass-based substrate (i.e., the glass-based substrate before it undergoes an ion exchange process). This results from one type of alkali metal ion in the as-formed glass, such as, for example $Li^+$ or $Na^+$, being replaced with larger alkali metal ions, such as, for example $Na^+$ or $K^+$, respectively. However, the glass composition at or near the center of the depth of the glass article will, in embodiments, still have the composition of the as-formed glass-based substrate.

In an aspect, a method of manufacturing a glass-based article comprises: exposing a glass-based substrate having opposing first and second surfaces defining a substrate thickness (t) and having a lithium aluminosilicate composition to an ion exchange treatment to form the glass-based article having a stress profile comprising: a spike region extending from the first surface to a knee at a spike depth of layer ($DOL_{spike}$); and a tail region extending from the knee to a center of the glass-based article, wherein within the tail region there is a post-spike near region, the ion exchange treatment comprising: a first molten salt bath comprising a potassium salt, a sodium salt, and a lithium salt, wherein a concentration of the lithium salt is in the range of greater than or equal to 15 weight % to less than or equal to 50 weight %; and a second molten salt bath comprising a potassium salt, a sodium salt, and a lithium salt, wherein a concentration of the lithium salt is in the range of greater than or equal to 0 weight % to less than or equal to 1 weight %; wherein the glass-based substrate comprises a molar ratio of sodium oxide ($Na_2O$) to lithium oxide ($Li_2O$) that is less than or equal to 0.63; and wherein the glass-based article comprises a molar ratio of sodium dioxide ($Na_2O$) to lithium dioxide ($Li_2O$) in the post-spike near region is greater than or equal to 0.9.

The method may utilize glass-based substrate comprising a molar ratio of sodium oxide ($Na_2O$) to lithium oxide ($Li_2O$) of less than or equal to 0.3.

In one or more embodiments, the post-spike near region is located over a distance that is deeper than the knee by from 20 to 100% of the $DOL_{spike}$.

In one or more embodiments, the molar ratio of sodium dioxide ($Na_2O$) to lithium dioxide ($Li_2O$) in the post-spike near region is averaged over the distance that deeper than the knee by from 20 to 100% of the $DOL_{spike}$.

In one or more embodiments, the molar ratio of sodium dioxide ($Na_2O$) to lithium dioxide ($Li_2O$) in the post-spike near region is averaged over a depth of from 6 micrometers to 10 micrometers.

In one or more embodiments, the post-spike near region the molar ratio of sodium dioxide ($Na_2O$) to lithium dioxide ($Li_2O$) is less than 1.5.

In one or more embodiments, the first molten salt bath comprises a concentration of the potassium salt in the range of greater than or equal to 30 weight % to less than or equal to 40 weight %, a concentration of the sodium salt in the range of greater than or equal to 30 weight % to less than or equal to 40 weight %, and the concentration of the lithium salt is in the range of greater than or equal to 25 weight % to less than or equal to 35 weight %, with the proviso that the concentrations of the potassium salt, the sodium salt, and the lithium salt in the first molten bath total 100%; and the second molten salt bath comprises a concentration of the potassium salt in the range of greater than or equal to 95 weight % to less than or equal to 99 weight %, a concentration of the sodium salt in the range of greater than or equal to 0 weight % to less than or equal to 5 weight %, and the concentration of the lithium salt is in the range of greater than or equal to 0.1 weight % to less than or equal to 1 weight %, with the proviso that the concentrations of the potassium salt, the sodium salt, and the lithium salt in the second molten bath total 100%.

In one or more embodiments, the stress profile further comprises: a maximum compressive stress ($CS_{max}$) greater than or equal to 650 MPa; a depth of compression (DOC) that is greater than or equal to 0.19·t; and a peak central tension (CT) in a tensile region.

In one or more embodiments, the potassium salt comprises: $KNO_3$, $K_2CO_3$, $K_3PO_4$, $K_2SO_4$, $K_3BO_3$, KCl, or combinations thereof.

In one or more embodiments, the sodium salt comprises: $NaNO_3$, $Na_2CO_3$, $Na_3PO_4$, $Na_2SO_4$, $Na_3BO_3$, NaCl, or combinations thereof.

In one or more embodiments, the lithium salt comprises: $LiNO_3$, $Li_2CO_3$, $Li_3PO_4$, $Li_2SO_4$, $Li_3BO_3$, LiCl, or combinations thereof.

In one or more embodiments, the potassium salt comprises $KNO_3$, the sodium salt comprises $NaNO_3$, and the lithium salt comprises $LiNO_3$.

The methods therein may be effective to form a glass-based article having a molar ratio of sodium dioxide ($Na_2O$) to lithium dioxide ($Li_2O$) in a post-spike near region of greater than or equal to 0.9 and/or less than or equal to 1.5.

The methods herein may be effective to form the glass-based substrate having a spike depth of layer ($DOL_{spike}$) that is greater than or equal to 4 micrometers and less than or equal to 8 micrometers.

Energy Parameters

If the amount of stored energy in a glass article exceeds a certain limit, the article breaks in multiple parts (e.g. >3) with several bifurcations upon breakage in what is considered a frangible behavior. When the amount of stored energy in a glass article is below a certain limit, the article breaks in a non-violent way without excessive bifurcation, which is referred to as non-frangible behavior.

Fundamental mechanics indicates that energy release is proportional to integration of the stress squared or the tensile energy in a tensile region of the stress profile. With respect to central tension (CT), stress profiles where a sample becomes frangible is typically when:

$$CT > (E/68 \text{ GPa}) * 75 \text{ MPa} * 1 \text{ mm}^{0.5} / \sqrt{t} \quad (1\text{-}A),$$

where t is the thickness in mm of the sample and E is the Young's modulus of the material in GPa. The resultant equation (1-A) gives the approximate CT where the glass is frangible in MPa, which can be scaled by Young's modulus and Thickness. Inventive articles herein are in the range where the glass is frangible and in many cases well above the limit specified in equation (1-A). For glasses with higher modulus, the CT limit for which approximately the glass becomes frangible increases as the energy stored in the tensile region for the same glass is reduced.

With respect to central tension (CT), stress profiles where a sample is non-frangible correspond to:

$$CT \leq (E/68 \text{ GPa}) * 75 \text{ MPa} * 1 \text{ mm}^{0.5} / \sqrt{t} \quad (1\text{-}B),$$

where t is the thickness in mm of the sample and E is the Young's modulus of the material in GPa.

The elastic energy stored by a stress profile is calculated according to the equation:

$$W_{el} = \frac{(1-v)}{E} \int \sigma^2 dx, \quad (2)$$

where v is the Poisson ratio, E is Young's modulus, and σ is the stress. For an exemplary glass of Composition A defined as 58.39 mol % $SiO_2$, 6.11 mol % $B_2O_3$, 17.83 mol % $Al_2O_3$, 1.73 mol % $Na_2O$, 0.18 mol % $K_2O$, 10.66 mol % $Li_2O$, 4.41 mol % MgO, 0.02 mol % $Fe_2O_3$, 0.08 mol % $SnO_2$, and 0.58 mol % CaO, the Poisson ratio (v) is 0.236, and the Young's modulus (E) is about 86.2 GPa.

Elastic energy (per unit area of glass) for a symmetric profile is give by:

$$W_{el}^{comp} = 2 \frac{1-v}{E} \int_0^{DOC} \sigma^2 dx. \quad (3)$$

Elastic energy in the tension region from the DOC to the center of the glass substrate is given by:

$$W_{el}^{tens} = 2 \frac{1-v}{E} \int_{DOC}^{0.5t} \sigma^2 dx. \quad (4)$$

A factor of 2 is used herein to take into account the symmetry of the stress profile so integration only in the first half is needed in this case. The total elastic energy stored in the substrate is the sum of the elastic energy of the single compression region and the half tension region:

$$W_{el}^{tot} = (W_{el}^{comp} + W_{el}^{tens}) \quad (5).$$

Units for the quantities in the above equations:

For stress: $[\sigma] = MPa \equiv 10^6 \text{ N/m}^2$.

For depth: $[x] = \mu m = 10^{-6}$ m.

For elastic energy (per unit substrate area):

$$[W_{el}] = MPa^{-1} * MPa * 10^6 \frac{N}{m^2} * 10^{-6} m \equiv \frac{N * m}{m^2} \equiv \frac{J}{m^2} \equiv \frac{\mu J}{mm^2}.$$

Another metric is elastic energy per unit substrate area per square root of the unit thickness of the substrate: $J/m^2 \cdot m^{0.5}$, which can serve as a more universal parameter because it is independent of the thickness and is valid for thickness ranges of both less than or equal to 50 µm to and greater than or equal to 2000 µm and all values and subranges therebetween.

In another aspect, a frangibility criterion may be introduced in the form of a normalized total, compressive and tensile energy defined as:

$$W_{norm}^{tot} = \frac{W_{el}^{tot}}{\left(\frac{1-v}{E}\right)} = \int_0^t \sigma^2, \quad (6)$$

$$W_{norm}^{comp} = 2 \frac{W_{el}^{comp}}{\left(\frac{1-v}{E}\right)} = \int_0^{DOC} \sigma^2, \quad (7)$$

$$W_{norm}^{tens} = 2 \frac{W_{el}^{tens}}{\left(\frac{1-v}{E}\right)} = \int_{DOC}^{0.5t} \sigma^2. \quad (8)$$

The use of a normalized energy has the advantage of being represented easily in units of $MPa^2 \cdot m$, and being independent of the material parameters.

Finally, the normalized energy further renormalized by the square root of the thickness (t) as a WT parameter, $$WT_{norm}^{tot} = W_{norm}^{tot}/\sqrt{t} \qquad (9),$$

$$WT_{norm}^{comp} = W_{norm}^{comp}/\sqrt{t} \qquad (10),$$

$$WT_{norm}^{tens} = W_{norm}^{tens}/\sqrt{t} \qquad (11).$$

These WT parameters have a dimension of MPa$^2 \cdot$m$^{0.5}$ and have embedded therein a variable thickness (t) component.

End Products

Figure 3A:
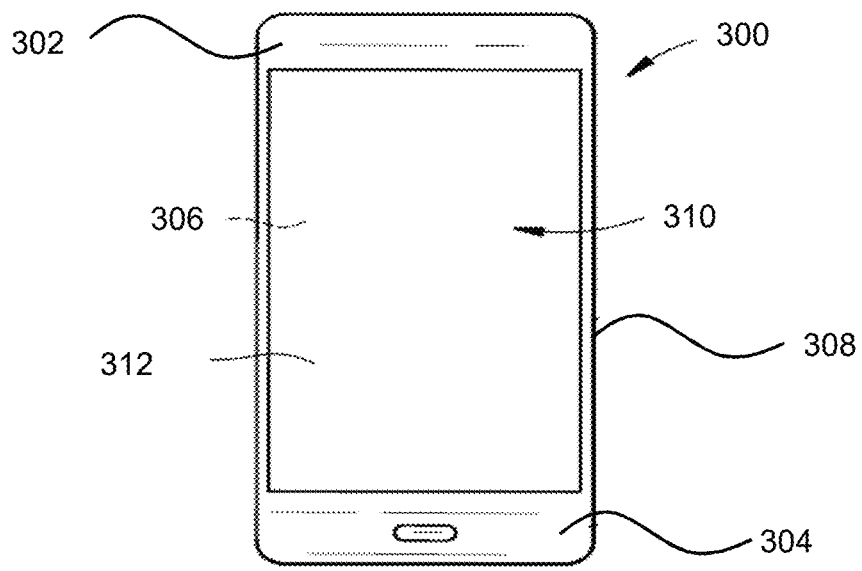
FIG. 3A is a plan view of an exemplary electronic device incorporating any of the glass articles disclosed herein.
Figure 3B:
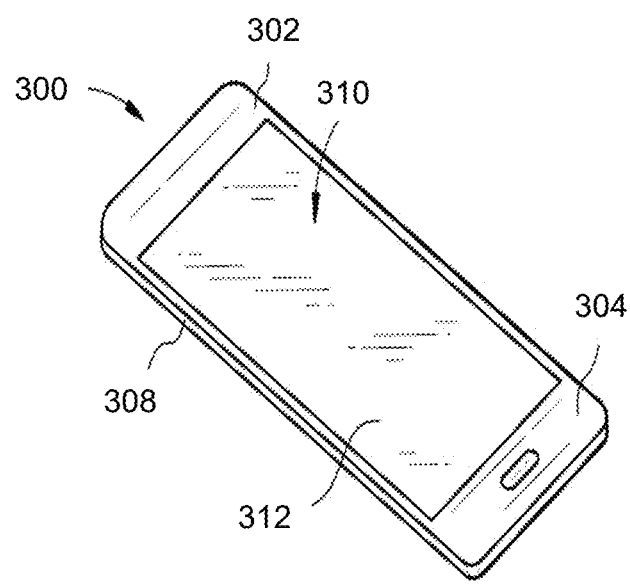
FIG. 3B is a perspective view of the exemplary electronic device of FIG. 3A.

The glass-based articles disclosed herein may be incorporated into another article such as an article with a display (or display articles) (e.g., consumer electronics, including mobile phones, tablets, computers, navigation systems, and the like), architectural articles, transportation articles (e.g., automobiles, trains, aircraft, sea craft, etc.), appliance articles, or any article that requires some transparency, scratch-resistance, abrasion resistance or a combination thereof. An exemplary article incorporating any of the glass articles disclosed herein is shown in FIGS. 3A and 3B. Specifically, FIGS. 3A and 3B show a consumer electronic device 300 including a housing 302 having front 304, back 306, and side surfaces 308; electrical components (not shown) that are at least partially inside or entirely within the housing and including at least a controller, a memory, and a display 310 at or adjacent to the front surface of the housing; and a cover 312 at or over the front surface of the housing such that it is over the display. In some embodiments, at least a portion of at least one of the cover 312 and/or housing 302 may include any of the glass articles disclosed herein.

EMBODIMENTS

The disclosure includes the following numbered embodiments:

Embodiment 1. A glass-based article comprising: a lithium aluminosilicate composition; a molar ratio of sodium oxide (Na$_2$O) to lithium oxide (Li$_2$O) that is less than or equal to 0.9 at the center of the glass-based article; a thickness t; and a stress profile comprising: a spike region extending from the first surface to a knee at a spike depth of layer (DOL$_{spike}$); and a tail region extending from the knee to a center of the glass-based article, wherein within the tail region there is a post-spike near region; wherein a molar ratio of sodium dioxide (Na$_2$O) to lithium dioxide (Li$_2$O) in the post-spike near region is greater than or equal to 0.9.

Embodiment 2. The glass-based article of the preceding embodiment, wherein the post-spike near region is located over a distance that is deeper than the knee by from 20 to 100% of the DOL$_{spike}$.

Embodiment 3. The glass-based article of the preceding embodiment, wherein the molar ratio of sodium dioxide (Na$_2$O) to lithium dioxide (Li$_2$O) in the post-spike near region is averaged over the distance that is deeper than the knee by from 20 to 100% of the DOL$_{spike}$.

Embodiment 4. The glass-based article of any preceding embodiment, wherein the molar ratio of sodium dioxide (Na$_2$O) to lithium dioxide (Li$_2$O) in the post-spike near region is averaged over a depth of from 6 micrometers to 10 micrometers.

Embodiment 5. The glass-based article of any preceding embodiment, wherein the molar ratio of sodium oxide (Na$_2$O) to lithium oxide (Li$_2$O) is less than or equal to 0.7 at the center of the glass-based article.

Embodiment 6. The glass-based article of the preceding embodiment, wherein the molar ratio of sodium oxide (Na$_2$O) to lithium oxide (Li$_2$O) is less than or equal to 0.3 at the center of the glass-based article.

Embodiment 7. The glass-based article of any preceding embodiment, wherein in the post-spike near region the molar ratio of sodium dioxide (Na$_2$O) to lithium dioxide (Li$_2$O) is less than 1.5.

Embodiment 8. The glass-based article of any preceding embodiment further comprising a stress profile comprising: a maximum compressive stress (CS$_{max}$) greater than or equal to 650 MPa; a depth of compression (DOC) that is greater than or equal to 0.19·t; and a peak central tension (CT) in a tensile region.

Embodiment 9. The glass-based article of the preceding embodiment, wherein the stress profile further comprises: a spike region extending from the first surface to a knee at a spike depth of layer (DOL$_k$); and wherein a compressive stress at the knee (CS$_k$) is greater than or equal to 100 MPa.

Embodiment 10. The glass-based article of any of embodiment 8 to the preceding embodiment, wherein the stress profile further comprises: a negative curvature region, wherein a second derivative of stress as a function of depth is negative.

Embodiment 11. The glass-based article of the preceding embodiment, wherein a maximum absolute value of an average of the second derivative in the range of 0.03·t to 0.175·t is greater than or equal to 0.0001 MPa/μm$^2$.

Embodiment 12. The glass-based article of embodiment 8, wherein: the peak central tension (CT) in a tensile region that is less than or equal to: (E/68 GPa)*75 MPa*1 mm$^{0.5}$/√(t), where E is Young's modulus value of the glass-based article.

Embodiment 13. The glass-based article of embodiment 8, wherein: the peak central tension (CT) in a tensile region that is greater than: (E/68 GPa)*75 MPa*1 mm$^{0.5}$/√(t), where E is Young's modulus value of the glass-based article.

Embodiment 14. The glass-based article of any preceding embodiment, comprising a Knoop scratch initiation threshold of greater than or equal to 5 N.

Embodiment 15. A glass-based article comprising: a lithium aluminosilicate composition, wherein at the center of the glass-based article, a molar ratio of sodium oxide (Na$_2$O) to lithium oxide (Li$_2$O) is less than 0.9; a thickness t; a molar ratio of sodium dioxide (Na$_2$O) to lithium dioxide (Li$_2$O) averaged over a distance from a depth of the glass-based article of 0.5 micrometers to a depth of 1 micrometer that is greater than or equal to 0.9 and less than 1.5; and a stress profile comprising: a maximum compressive stress (CS$_{max}$) greater than or equal to 650 MPa; a depth of compression (DOC) that is greater than or equal to 0.19·t; and a peak central tension (CT) in a tensile region that is less than or equal to: (E/68 GPa)*75 MPa*1 mm$^{0.5}$/√(t), where E is Young's modulus value of the glass-based article; and a Knoop scratch initiation threshold of greater than or equal to 5 N.

Embodiment 16. The glass-based article of the preceding embodiment, wherein an elastic energy (W$_{el}^{tens}$) stored in a tensile region is less than or equal to 40 J/m$^2$.

Embodiment 17. The glass-based article of the preceding embodiment, wherein the elastic energy (W$_{el}^{tens}$) is less than or equal to 25 J/m$^2$.

Embodiment 18. The glass-based article of any of embodiments 15 to the preceding embodiment, wherein a normalized tensile energy ($WT_{norm}^{tens}$) stored in a tensile region of the glass-based article is less than or equal to 150 MPa²·m^{0.5}.

Embodiment 19. The glass-based article of the preceding embodiment, wherein the normalized tensile energy ($WT_{norm}^{tens}$) is less than or equal to 100 MPa²·m^{0.5}.

Embodiment 20. A glass-based article comprising: a lithium aluminosilicate composition, wherein at the center of the glass-based article, a molar ratio of sodium oxide ($Na_2O$) to lithium oxide ($Li_2O$) is less than 0.9; a thickness t; a molar ratio of sodium dioxide ($Na_2O$) to lithium dioxide ($Li_2O$) averaged over a distance from a depth of the glass-based article of 0.5 micrometers to a depth of 1 micrometer that is greater than or equal to 0.9 and less than 1.5; and a stress profile comprising: a maximum compressive stress ($CS_{max}$) greater than or equal to 650 MPa; a depth of compression (DOC) that is greater than or equal to 0.19·t; and a peak central tension (CT) in a tensile region that is greater than: (E/68 GPa)*75 MPa*1 mm^{0.5}/√(t), where E is Young's modulus value of the glass-based article; and a Knoop scratch initiation threshold of greater than or equal to 5 N.

Embodiment 21. The glass-based article of the preceding embodiment, wherein an elastic energy ($W_{el}^{tens}$) stored in a tensile region is greater than 25 J/m².

Embodiment 22. The glass-based article of the preceding embodiment, wherein the elastic energy ($W_{el}^{tens}$) is greater than 40 J/m².

Embodiment 23. The glass-based article of any of embodiments 20 to the preceding embodiment, wherein a normalized tensile energy ($WT_{norm}^{tens}$) stored in a tensile region of the glass-based article is greater than 100 MPa²·m^{0.5}.

Embodiment 24. The glass-based article of the preceding embodiment, wherein the normalized tensile energy ($WT_{norm}^{tens}$) is greater than 150 MPa²·m^{0.5}.

Embodiment 25. The glass-based article of any preceding embodiment, wherein the Knoop scratch initiation threshold is greater than or equal to 8 N.

Embodiment 26. The glass-based article of the preceding embodiment, wherein an average width at a center of scratches at 8 N of scratch testing with a Knoop geometry diamond tip and a rate of 9.34 mm/min is less than or equal to 600 micrometers after 10 scratches.

Embodiment 27. The glass-based article of any of embodiment 15 to the preceding embodiment, wherein a composition of the glass-based article at a center of the article comprises a molar ratio of sodium oxide ($Na_2O$) to lithium oxide ($Li_2O$) of less than or equal to 0.63.

Embodiment 28. The glass-based article of any preceding embodiment, wherein the composition of the glass-based article at the center of the article has an amount of Li (mol %) greater than: Na (mol %) or the sum of any remaining non-Li alkali present.

Embodiment 29. The glass-based article of any preceding embodiment, wherein the CT is greater than or equal to 90 MPa.

Embodiment 30. The glass-based article of any preceding embodiment, wherein the thickness t is in the range of greater than or equal to 0.02 millimeters to less than or equal to 2 millimeters.

Embodiment 31. The glass-based article of any preceding embodiment, wherein the DOC is located at a depth of greater than or equal to 100 micrometers.

Embodiment 32. The glass-based article of any preceding embodiment, wherein the $CS_{max}$ is greater than or equal 750 MPa.

Embodiment 33. The glass-based article of any preceding embodiment, wherein the $CS_{max}$ is greater than or equal 1000 MPa.

Embodiment 34. The glass-based article of any preceding embodiment, having an alkali metal present in a non-zero varying concentration extending from a surface of the glass-based article to a depth of the glass-based article.

Embodiment 35. The glass-based article of the preceding embodiment, wherein the alkali metal is selected from the group consisting of: lithium (Li), sodium (Na), potassium (K), rubidium (Rb), cesium (Cs), francium (Fr), and combinations thereof.

Embodiment 36. The glass-based article of the preceding embodiment, wherein the alkali metal is selected from the group consisting of: lithium (Li), sodium (Na), potassium (K), and combinations thereof.

Embodiment 37. The glass-based article of any preceding embodiment, having a non-alkali metal present in a non-zero varying concentration extending from a surface of the glass-based article to a depth of the glass-based article.

Embodiment 38. The glass-based article of the preceding embodiment, wherein the non-alkali metal is selected from the group consisting of: copper (Cu), gold (Au), silver (Ag), and combinations thereof.

Embodiment 39. The glass-based article of any preceding embodiment, wherein at the center of the glass-based article, a boron oxide content is greater than or equal to 1.5 mol % and less than or equal to 7.0 mol %.

Embodiment 40. The glass-based article of any of embodiment 15 to the preceding embodiment, wherein the stress profile further comprises: a negative curvature region, wherein a second derivative of stress as a function of depth is negative.

Embodiment 41. The glass-based article of the preceding embodiment, wherein a maximum absolute value of an average of the second derivative in the range of 0.03·t to 0.175·t is greater than or equal to 0.0001 MPa/μm².

Embodiment 42. A glass-based article comprising: a lithium aluminosilicate composition; a molar ratio of sodium oxide ($Na_2O$) to lithium oxide ($Li_2O$) that is less than or equal to 0.9 at the center of the glass-based article; a thickness t; and a stress profile comprising: a spike region extending from the first surface to a knee at a spike depth of layer ($DOL_{spike}$); and a tail region extending from the knee to a center of the glass-based article; wherein for a portion of the spike region, a concentration of the lithium exceeds a concentration of the sodium.

Embodiment 43. A consumer electronic product comprising: a housing having a front surface, a back surface, and side surfaces; electrical components provided at least partially within the housing, the electrical components including at least a controller, a memory, and a display, the display being provided at or adjacent the front surface of the housing; and a cover disposed over the display; wherein at least a portion of at least one of the housing and the cover comprises the glass-based article of any preceding embodiment.

Embodiment 44. A method of manufacturing a glass-based article comprising: exposing a glass-based substrate having opposing first and second surfaces defining a substrate thickness (t) and having a lithium aluminosilicate composition to an ion exchange treatment to form the glass-based article having a stress profile comprising: a spike region extending from the first surface to a knee at a spike depth of layer ($DOL_{spike}$); and a tail region extending from the knee to a center of the glass-based article, wherein within the tail region there is a post-spike near region, the ion exchange treatment comprising: a first molten salt bath comprising a potassium salt, a sodium salt, and a lithium salt, wherein a concentration of the lithium salt is in the range of greater than or equal to 15 weight % to less than or equal to 50 weight %; and a second molten salt bath comprising a potassium salt, a sodium salt, and a lithium salt, wherein a concentration of the lithium salt is in the range of greater than or equal to 0 weight % to less than or equal to 1 weight %; wherein the glass-based substrate comprises a molar ratio of sodium oxide ($Na_2O$) to lithium oxide ($Li_2O$) that is less than or equal to 0.63; and wherein the glass-based article comprises a molar ratio of sodium dioxide ($Na_2O$) to lithium dioxide ($Li_2O$) in the post-spike near region is greater than or equal to 0.9.

Embodiment 45. The method of embodiment 44, wherein the glass-based substrate comprises a molar ratio of sodium oxide ($Na_2O$) to lithium oxide ($Li_2O$) of less than or equal to 0.3.

Embodiment 46. The method of the preceding embodiment, wherein the post-spike near region is located over a distance that is deeper than the knee by from 20 to 100% of the $DOL_{spike}$.

Embodiment 47. The method of the preceding embodiment, wherein the molar ratio of sodium dioxide ($Na_2O$) to lithium dioxide ($Li_2O$) in the post-spike near region is averaged over the distance that is deeper than the knee by from 20 to 100% of the $DOL_{spike}$.

Embodiment 48. The method of any of embodiment 44 to the preceding embodiment, wherein the molar ratio of sodium dioxide ($Na_2O$) to lithium dioxide ($Li_2O$) in the post-spike near region is averaged over a depth of from 6 micrometers to 10 micrometers.

Embodiment 49. The method of any of embodiment 44 to the preceding embodiment, wherein in the post-spike near region the molar ratio of sodium dioxide ($Na_2O$) to lithium dioxide ($Li_2O$) is less than 1.5.

Embodiment 50. The method of any of embodiment 44 to the preceding embodiment, wherein: the first molten salt bath comprises a concentration of the potassium salt in the range of greater than or equal to 30 weight % to less than or equal to 40 weight %, a concentration of the sodium salt in the range of greater than or equal to 30 weight % to less than or equal to 40 weight %, and the concentration of the lithium salt is in the range of greater than or equal to 25 weight % to less than or equal to 35 weight %, with the proviso that the concentrations of the potassium salt, the sodium salt, and the lithium salt in the first molten bath total 100%; and the second molten salt bath comprises a concentration of the potassium salt in the range of greater than or equal to 95 weight % to less than or equal to 99 weight %, a concentration of the sodium salt in the range of greater than or equal to 0 weight % to less than or equal to 5 weight %, and the concentration of the lithium salt is in the range of greater than or equal to 0.1 weight % to less than or equal to 1 weight %, with the proviso that the concentrations of the potassium salt, the sodium salt, and the lithium salt in the second molten bath total 100%.

Embodiment 51. The method of any of embodiment 44 to the preceding embodiment, wherein the stress profile further comprises: a maximum compressive stress ($CS_{max}$) greater than or equal to 650 MPa; a depth of compression (DOC) that is greater than or equal to 0.19·t; and a peak central tension (CT) in a tensile region.

Embodiment 52. The method of any of embodiment 44 to the preceding embodiment, wherein the potassium salt comprises: $KNO_3$, $K_2CO_3$, $K_3PO_4$, $K_2SO_4$, $K_3BO_3$, KCl, or combinations thereof.

Embodiment 53. The method of any of embodiment 44 to the preceding embodiment, wherein the sodium salt comprises: $NaNO_3$, $Na_2CO_3$, $Na_3PO_4$, $Na_2SO_4$, $Na_3BO_3$, NaCl, or combinations thereof.

Embodiment 54. The method of any of embodiment 44 to the preceding embodiment, wherein the lithium salt comprises: $LiNO_3$, $Li_2CO_3$, $Li_3PO_4$, $Li_2SO_4$, $Li_3BO_3$, LiCl, or combinations thereof.

Embodiment 55. The method of any of embodiment 44 to the preceding embodiment, wherein the potassium salt comprises $KNO_3$, the sodium salt comprises $NaNO_3$, and the lithium salt comprises $LiNO_3$.

EXAMPLES

Various embodiments will be further clarified by the following examples. In the Examples, prior to being strengthened, the Examples are referred to as "substrates". After being subjected to strengthening, the Examples are referred to as "articles" or "glass-based articles".

Glass substrates according to Compositions A-B were ion exchanged and the resulting articles tested.

Compositions A and B had the following compositions. Composition A: 17.83 mol % $Al_2O_3$, 6.11 mol % $B_2O_3$, 4.41 mol % MgO, 1.73 mol % $Na_2O$, 58.39 mol % $SiO_2$, 0.08 mol % $SnO_2$, 0.18 mol % $K_2O$, 0.02 mol % $Fe_2O_3$, 0.58 mol % CaO, and 10.66 mol % $Li_2O$ (0.00 mol % SrO, 0.00 mol % ZnO, and 0.00 mol % $P_2O_5$); and a $Na_2O/Li_2O$ molar ratio of 0.16. Composition B: 12.88 mol % $Al_2O_3$, 1.84 mol % $B_2O_3$, 2.86 mol % MgO, 2.39 mol % $Na_2O$, 70.96 mol % $SiO_2$, 0.07 mol % $SnO_2$, 0.02 mol % $Fe_2O_3$, 8.13 mol % $Li_2O$, and 0.85 mol % ZnO, (0.00 mol % $K_2O$, 0.00 mol % CaO, 0.00 mol % SrO, and 0.00 mol % $P_2O_5$); and a $Na_2O/Li_2O$ molar ratio of 0.29.

Knoop scratch initiation threshold. Several glass articles were prepared under varying ion exchange conditions. Scratch testing of the glass articles of the examples was completed using a Bruker UMT (universal mechanical tester) with a Knoop geometry diamond tip from Gilmore Diamonds. The tip was loaded into a surface of the glass article at a rate of 0.14 N/s to a desired load of 5N or 8N, with two to five scratches per load, at which point the tip was dragged laterally across the article for 10 mm at a rate of 9.34 mm/min. From there, the diamond tip was unloaded at a rate of 0.14 N/s.

The stress profile discussed herein was measured via the Refractive Near Field (RNF) method where the CT matches the measurements of CT provided by scattering polarimetry using a SCALP-5 made by Glasstress Co., Estonia. In addition, due to limitations of the RNF to provide accurate information in the first ~2 μm of the stress profile due to the size of the beam used in this measurement technique, the RNF data is extrapolated to the surface to find the stress at the surface so that it also matches the measurements done by the FSM-6000 LE from Orihara, Japan that measures the estimated stress at the surface. Therefore, the total stress profile matches at the center of the sample the CT measured by the SCALP instrument and at the surface the CS measured by the FSM-6000 LE instrument, using a light source at 365 nm, providing an accurate representation of the whole stress profile from surface to the center of the sample.

Emission spectroscopy (GDOES) collected data of ionic distribution inside glass articles after ion exchange after initial calibration of a reference glass via ICP (inductive coupled plasma).

Examples 1-17 and A-E (Comparative)

Table 1A provides a summary of dual ion exchange (DIOX) conditions using nitrate salts of K, Na, and Li for Examples 1-17, and resulting compressive stress (CS), compressive stress at a knee ($CS_k$), knee depth of layer ($DOL_k$), central tension (CT), and depth of compression (DOC) values. Both Step I and Step II included the addition of 0.5 wt. % silicic acid to the IOX bath. The conditions tested were selected to achieve a maximum CT possible for a time processing span of <16 hours.

TABLE 1A

| EXAMPLE | Substrate | DIOX Step I* | DIOX Step II* | CS (MPa) | $CS_k$ (MPa) | $DOL_k$ (μm) | CT (MPa) | DOC (μm) |
|---|---|---|---|---|---|---|---|---|
| 1 | A | 35 wt % K/35 wt % Na/30 wt % Li, 450° C., 9 hours | 96 wt % K/4 wt % Na + 0.07 Li, 450° C., 6 hours | 830 | 148 | 5.6 | 95.4 Not frangible | 171 0.214 · t |
| 2 | A | 35 wt % K/35 wt % Na/30 wt % Li, 450° C., 9 hours | 97.5 wt % K/2.5 wt % Na, 450° C., 3 hours | 931 | — | 4.5 | 72.4 Not frangible | — |
| 3 | A | 35 wt % K/35 wt % Na/30 wt % Li, 450° C., 9 hours | 95 wt % K/5 wt % Na, 450° C., 3 hours | 896 | — | 4.2 | 94.1 Not Frangible | — |
| 4 | A | 35 wt % K/35 wt % Na/30 wt % Li, 450° C., 9 hours | 92.5 wt % K/7.5 wt % Na, 450° C., 3 hours | 861 | — | 4.2 | 101.3 Frangible | — |
| 5 | A | 35 wt % K/35 wt % Na/30 wt % Li, 450° C., 9 hours | 96 wt % K/4 wt % Na, 450° C., 3 hours | 920 | 194 | 4.2 | 87.9 Not frangible | 147 |
| 6 | A | 35 wt % K/35 wt % Na/30 wt % Li, 450° C., 9 hours | 96 wt % K/4 wt % Na, 450° C., 6 hours | 855 | 154 | 5.8 | 103.2 Not frangible | 172 |
| 7 | A | 35 wt % K/35 wt % Na/30 wt % Li, 450° C., 9 hours | 95.5 wt % K/3.5 wt % Na, 450° C., 3 hours | 930 | — | 4.2 | 84.4 Not frangible | — |
| 8 | A | 35 wt % K/35 wt % Na/30 wt % Li, 450° C., 9 hours | 95.5 wt % K/3.5 wt % Na, 450° C., 6 hours | 862 | — | 6.0 | 99.4 Not frangible | — |
| 9 | A | 35 wt % K/35 wt % Na/30 wt % Li, 450° C., 9 hours | 96 wt % K/4 wt % Na, 0.7% Li, 450° C., 3 hours | 783.4 | — | 3.5 | 73.0 Not frangible | — |
| 10 | A | 35 wt % K/35 wt % Na/30 wt % Li, 450° C., 9 hours | 96 wt % K/4 wt % Na, 0.7% Li, 450° C., 6 hours | 721 | — | 4.5 | 85.6 Not frangible | — |
| 11 | A | 35 wt % K/35 wt % Na/30 wt % Li, 450° C., 9 hours | 96.5 wt % K/3.5 wt % Na, 0.7% Li, 450° C., 3 hours | 829.2 | — | 3.4 | 63.0 Not frangible | — |
| 12 | A | 35 wt % K/35 wt % Na/30 wt % Li, 450° C., 9 hours | 96.5 wt % K/3.5 wt % Na, 0.7% Li, 450° C., 6 hours | 778.8 | — | 4.6 | 78.1 Not frangible | — |
| 13 | A | 42.5 wt % K/42.5 wt % Na/15 wt % Li, 450° C., 9 hours | 95 wt % K/5 wt % Na, 450° C., 2 hours | 963.6 | — | 3.3 | 115.4 Frangible | — |
| 14 | A | 41.25 wt % K/41.25 wt % Na/17.5 wt % Li, 450° C., 9 hours | 95 wt % K/5 wt % Na, 450° C., 2 hours | 904.4 | — | 3.7 | 109.5 Frangible | — |
| 15 | A | 41.25 wt % K/41.25 wt % Na/17.5 wt % Li, 450° C., 9 hours | 95 wt % K/5 wt % Na, 450° C., 2 hours | 911.7 | — | 3.4 | 104.6 Frangible | — |
| 16 | A | 38.75 wt % K/38.75 wt % Na/22.5 wt % Li, 450° C., 9 hours | 95 wt % K/5 wt % Na, 450° C., 2 hours | 851.3 | — | 4.0 | 101.1 Not frangible | — |
| 17 | A | 37.5 wt % K/37.5 wt % Na/25 wt % Li, 450° C., 9 hours | 95 wt % K/5 wt % Na, 450° C., 2 hours | 943.7 | — | 3.5 | 96.6 Frangible | — |

*Each of Step I and Step II included the addition of 0.5 wt. % silicic acid.

Table 1B provides a summary of ion exchange conditions using nitrate salts of K, Na, and Li for Examples A-E (comparative).

TABLE 1B

| EXAMPLE | Substrate | IOX |
|---|---|---|
| A Comparative | B | SIOX 93.5 wt % K/6.5 wt % Na, 430° C., 4.5 hours |
| B Comparative | B | SIOX 93.5 wt % K/6.5 wt % Na, 430° C., 4.5 hours |
| C Comparative | A | DIOX Step I: 35 wt % K/35 wt % Na/30 wt % Li, 450° C., 12 hours Step II: 95 wt % K/5 wt % Na, 450° C. 2 hours |
| D Comparative | A | DIOX Step I: 88 wt % K/12 wt % Na, 450° C. 13 hours Step II: 85 wt % K/15 wt % Na, 450° C. 0.5 hours |
| E Comparative | A | SIOX 88 wt % K/12 wt % Na, + 2 wt % Li 450° C., 8.4 hours |
| F Comparative | A | DIOX Step I: 88 wt % K/12 wt % Na, + 4 wt % Li, 450° C. 13 hours Step II: 96 wt % K/4 wt % Na, 450° C., 0.5 hours |

* Each of Step I and, when present, Step II included the addition of 0.5 wt. % silicic acid.

Figure 4:
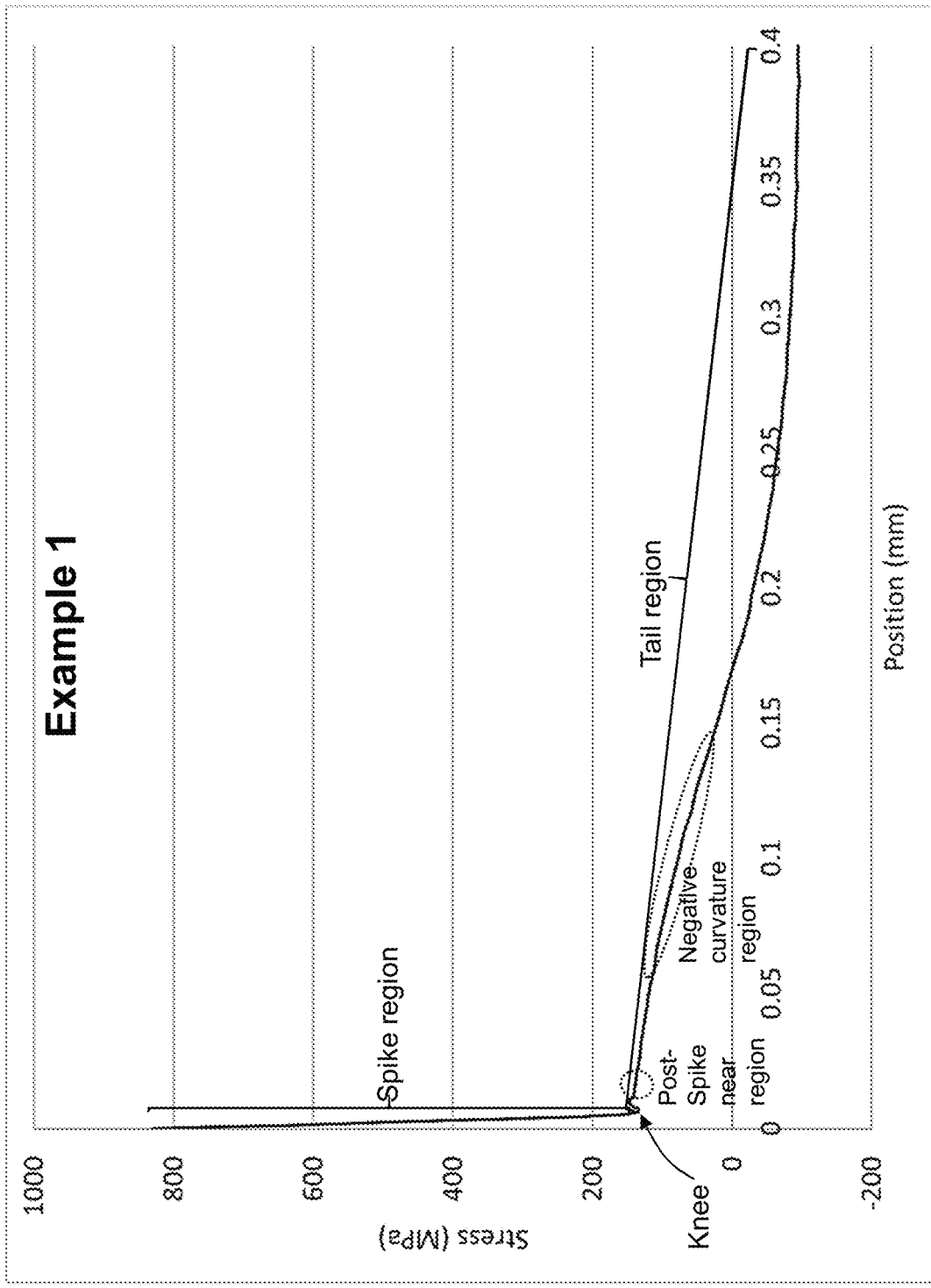
FIG. 4 is a graph of stress (MPa) versus position (mm) from a surface for an embodiment of a glass-based article.
Figure 5:
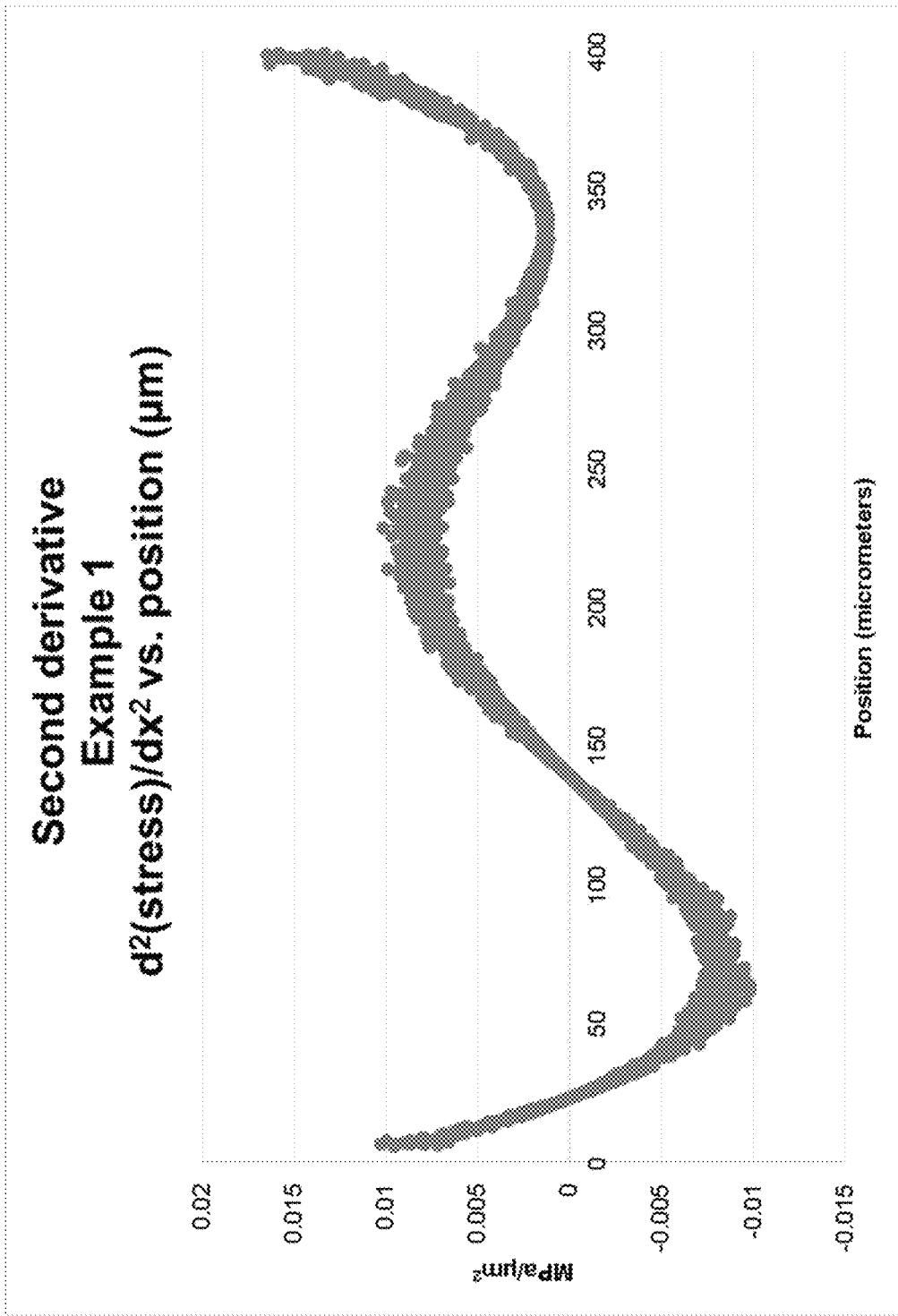
FIG. 5 is graph of the second derivative of the stress profile plot of FIG. 4.

FIG. 4 is a plot of stress as a function of depth for one-half the thickness (t) of the article after ion exchange for Example 1 to a depth of 400 micrometers (0.4 mm). There is a high spike of stress at the surface (830 MPa). Also shown in FIG. 4 is a spike region and extending to a knee and a tail region. Within the tail region, there was a post-spike near region and a negative curvature region. The depth of compression was ~171 micrometers, which corresponds to 0.214·t, as t was 800 mm. Example 1 shows the negative curvature region and a negative average second derivative over the depth of from approximately 24 μm to 140 μm, which corresponds to 0.03·t to 0.175·t. FIG. 5 is a plot of the second derivative of the stress profile of FIG. 4. The absolute value of the average second derivative over the depth range of 24 μm to 140 μm was 0.00533.

Without intending to be bound by theory, due to non-linear diffusion and stress relaxation, the resulting stress profile of the glass of composition A according to Example 1 was S-shaped. The unique S-shape together with the high CT value of 95.4 MPa and the article being non-frangible after breakage are of interest.

In Table 2, Young's modulus E and Poisson ratio ν for Example 1 is provided. Based on the stress profiles shown in FIG. 4 and the information in Table 1, the following energy parameters for the compressive region were computed: $W_{el}^{tens}$, $W_{norm}^{tens}$, $WT_{norm}^{tens}$ for the tensile region and $W_{el}^{comp}$, $W_{norm}^{comp}$, $WT_{norm}^{comp}$.

TABLE 2

| EXAMPLE | E (GPa) | N (a.u.) | $W_{el}^{tens}$ (J/m²) | $W_{norm}^{tens}$ (MPa²·m) | $WT_{norm}^{tens}$ (MPa²·m^{0.5}) | $W_{el}^{comp}$ (J/m²) | $W_{norm}^{comp}$ (MPa²·m) | $WT_{norm}^{comp}$ (MPa²·m^{0.5}) |
|---|---|---|---|---|---|---|---|---|
| 1 | 83.2 | 0.236 | 22.70 | 2.472 | 87.40 | 42.28 | 4.60 | 162.64 |

Figure 6:
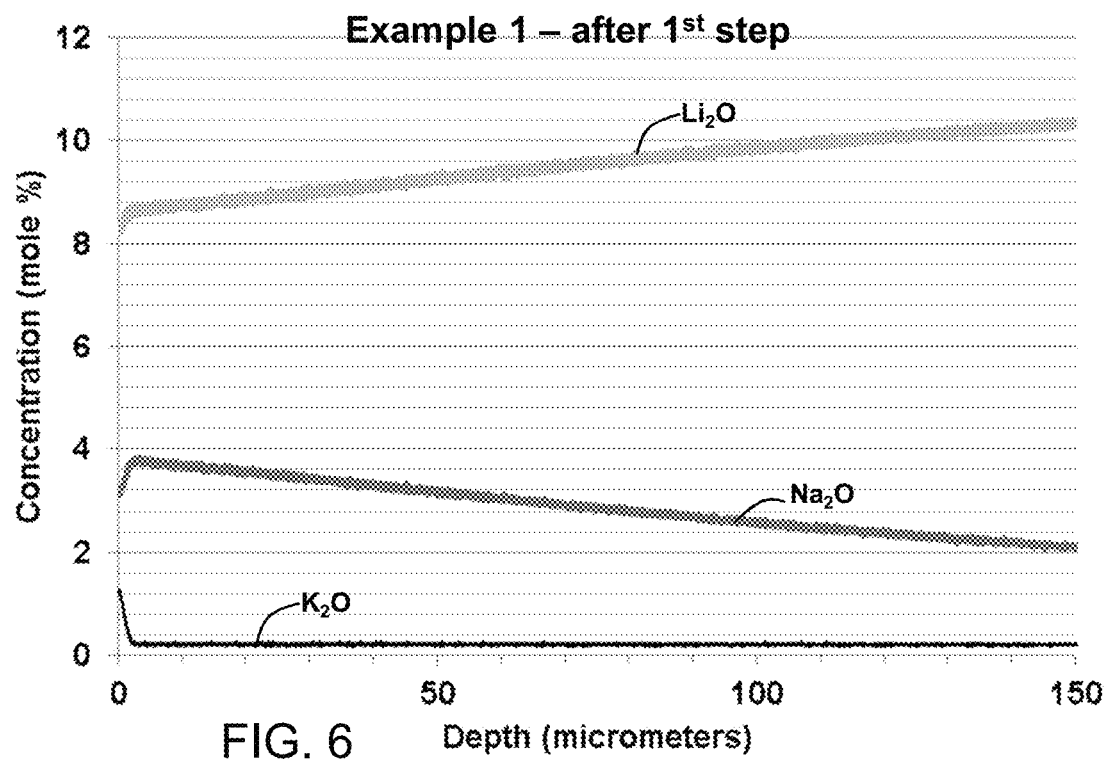
FIGS. 6-7 are graphs of oxide molar concentration as a function of depth in a glass article after a first IOX step from a first surface (0 micrometers) for an embodiment.
Figure 7:
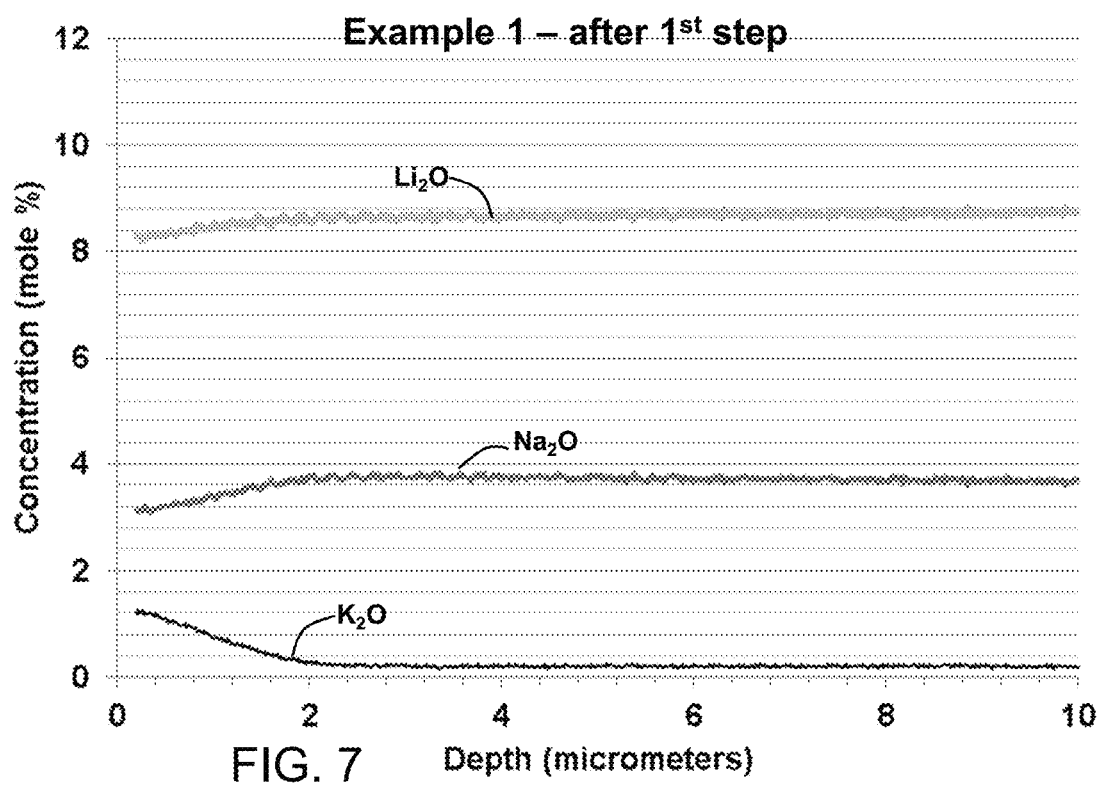

FIGS. 6-7 provide GDOES elemental profiles of oxide molar concentration as a function of depth in the glass article from a first surface (0 micrometers) for Example 1 after the 1st IOX step (35 wt % K/35 wt % Na/30 wt % Li, 450° C., 9 hours). FIG. 6 shows the profile to a depth of 150 micrometers. FIG. 7 shows the profile of FIG. 6 to a depth of 10 micrometers. The data from 0 to 0.25 micrometers is subject to artifacts of measurement.

Figure 8:
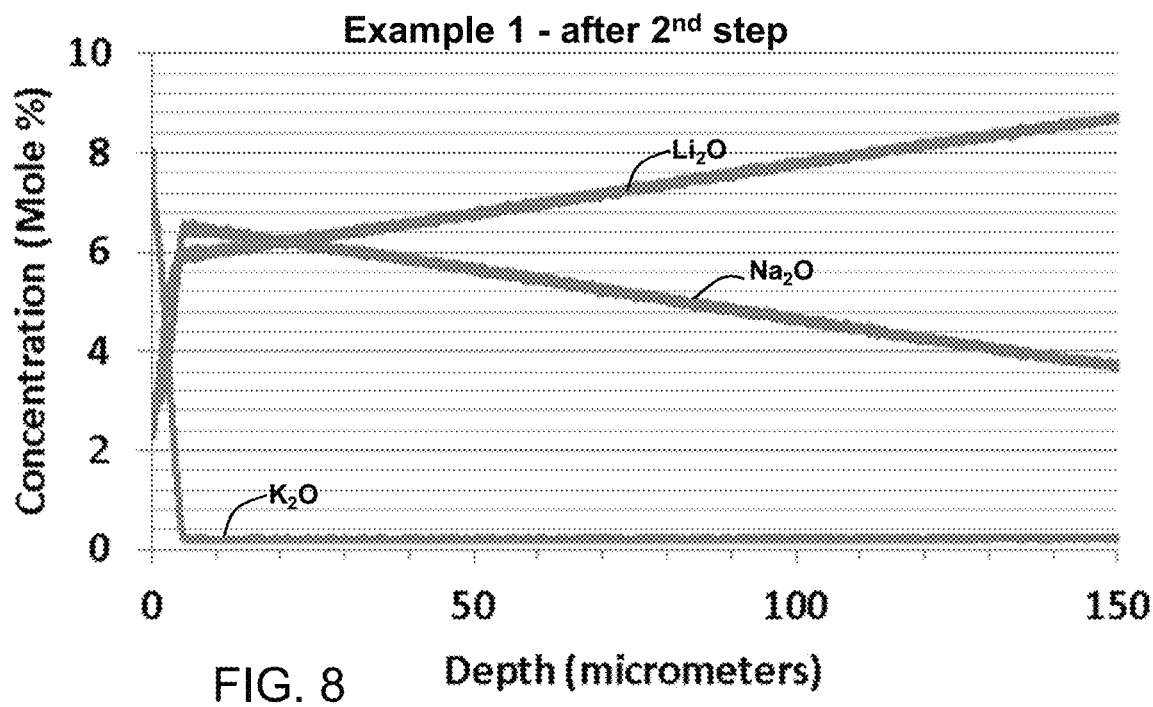
FIGS. 8-9 are graphs of oxide molar concentration as a function of depth in in a glass article after a second IOX step from a first surface (0 micrometers) for an embodiment.
Figure 9:
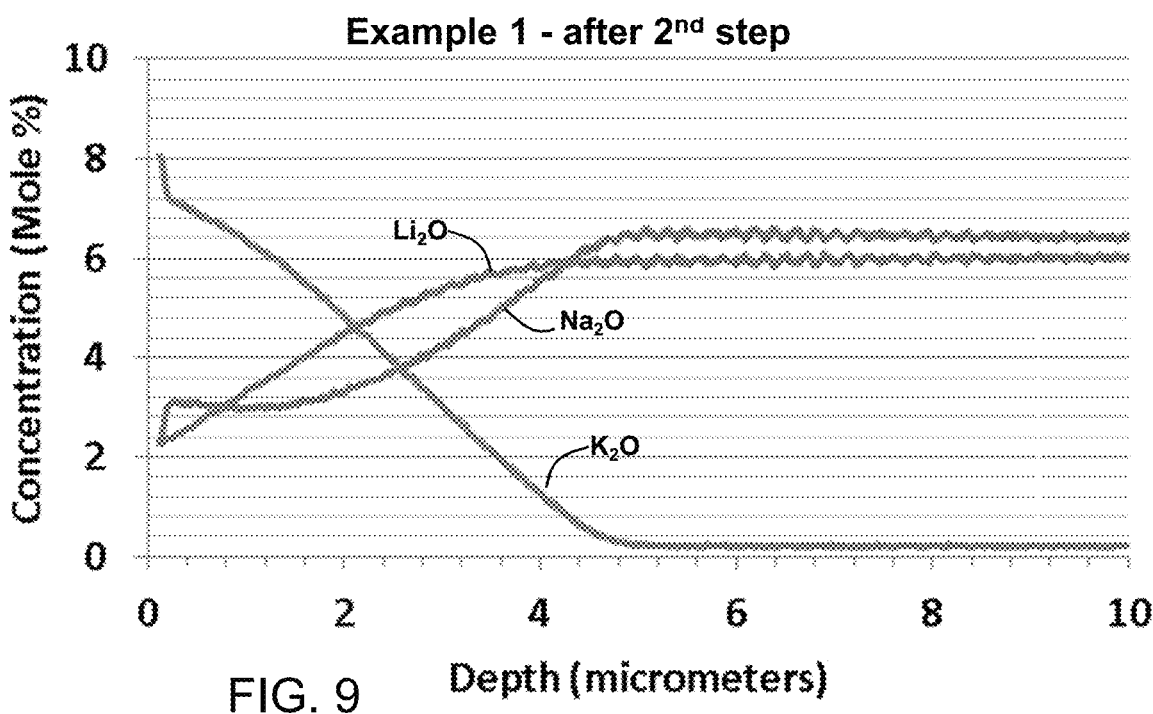

FIGS. 8-9 provide GDOES elemental profiles of oxide molar concentration as a function of depth in the glass article from a first surface (0 micrometers) for Example 1 after the $2^{nd}$ IOX step (96 wt % K/4 wt % Na+0.07 Li, 450° C., 6 hours). FIG. 8 shows the profile to a depth of 150 micrometers. FIG. 9 shows the profile of FIG. 8 to a depth of 10 micrometers, which includes details of the spike region. The data from 0 to 0.25 micrometers is subject to artifacts of measurement.

In FIG. 8, the potassium spike ($DOL_K$) and the spike depth ($DOL_{spike}$) were located at 5 micrometers. Over a portion of the spike region, a concentration of the lithium exceeded a concentration of the sodium. In the spike region for this example, the concentration of the lithium exceeded the concentration of the sodium over the range of 0.76 micrometers to 4.37 micrometers, or about 72% of the 5 micrometer spike region. In the post-spike near region, e.g., from greater than or equal to 6 micrometers to less than or equal to 10 micrometers, molar distribution of ions of sodium and lithium was quasi-linear, which contributed to a deep DOC found in the stress profile of FIG. 4.

In FIG. 9, the area of analysis is magnified, to include details of the spike region (to 5 micrometers) and the post-spike near region (e.g., from about greater than or equal to 6 micrometers to less than or equal to 10 micrometers). In this spike area, the potassium of the spike preferentially exchanged with the sodium instead of the lithium, which led to curvatures different from traditional curvatures in the molar oxide concentration in the spike region for lithium and sodium. For sodium, the curvature was positive where the gradient or derivative of the sodium concentration was increasing at the midpoint (e.g., at 2.5 micrometers) of the spike region. For lithium the curvature was negative where the derivative of the lithium concentration was decreasing at the midpoint (e.g., at 2.5 micrometers) of the spike region.

At a location at or near the midpoint of the spike region, the amount of lithium oxide was larger than the amount of sodium oxide, which is a feature of the DIOX process due to high Li content used in the first bath of the IOX process.

In FIG. 9, the averages of measured concentration values over the distance from 0.5 micrometers to 1 micrometers, to represent the ratio just below the surface, were: 3.01 for $Na_2O$ mol % and 2.98 for $Li_2O$ mol %. The resulting molar ratio of sodium dioxide ($Na_2O$) to lithium dioxide ($Li_2O$) just below the surface was 1.01. Also in FIG. 9, the averages of measured concentration values over the distance from 6 micrometers to 10 micrometers were: 6.45 for $Na_2O$ mol % and 5.98 for $Li_2O$ mol %. The resulting molar ratio of sodium dioxide ($Na_2O$) to lithium dioxide ($Li_2O$) in the post-spike near region was 1.08. Further in FIG. 9, the averages of measured concentration values for depths of less than or equal to 0.4 micrometers: 5.96 for $K_2O$ mol % and 4.32 for $Na_2O$ mol %. The resulting molar ratio of potassium dioxide ($K_2O$) to sodium dioxide ($Na_2O$) in this region was 1.38.

Figure 10:
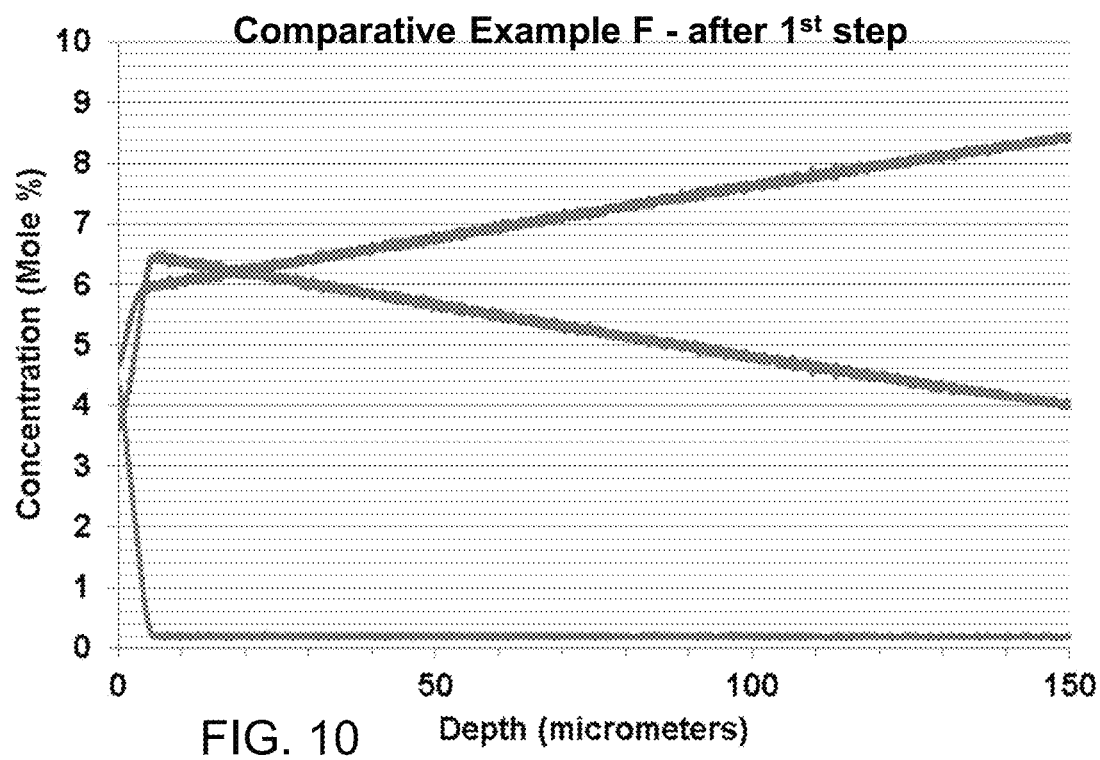
FIGS. 10-11 are graphs of oxide molar concentration as a function of depth in a glass article after a first IOX step from a first surface (0 micrometers) for a comparative example.
Figure 11:
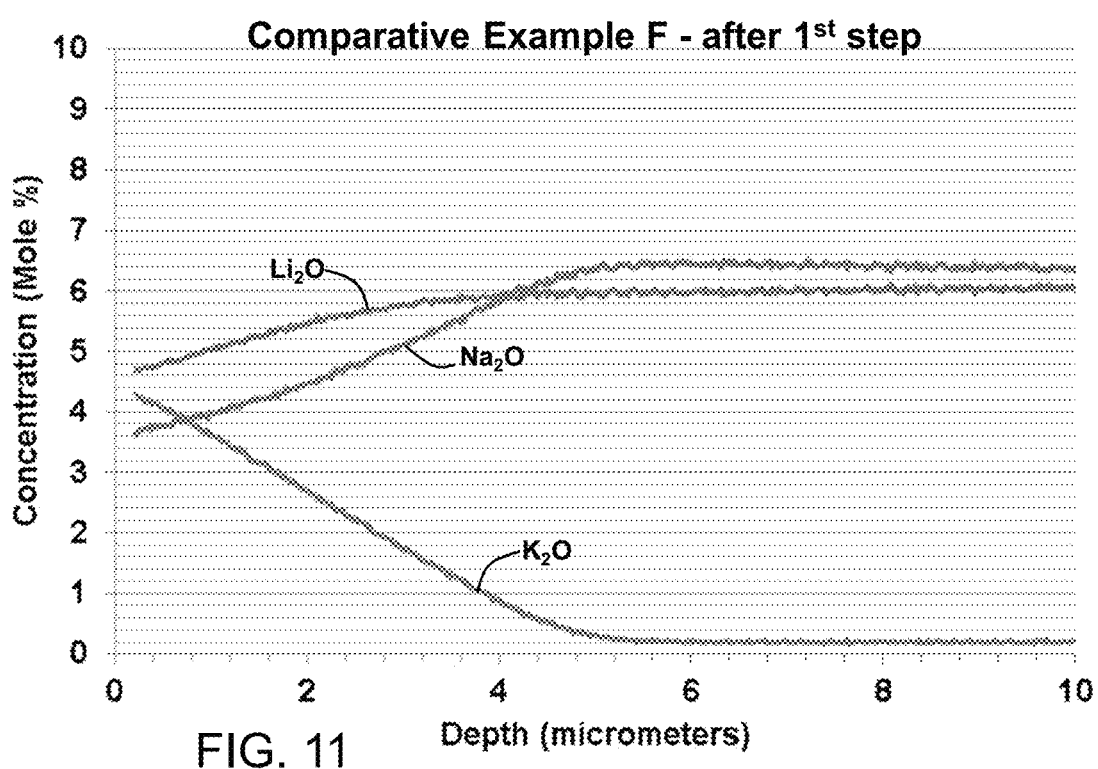

FIGS. 10-11 provide GDOES elemental profiles of oxide molar concentration as a function of depth in the glass article from a first surface (0 micrometers) for Comparative Example F after the 1st IOX step (Step I: 88 wt % K/12 wt % Na, +4 wt % Li, 450° C., 13 hours). FIG. 10 shows the profile to a depth of 150 micrometers. FIG. 11 shows the profile of FIG. 10 to a depth of 10 micrometers. The data from 0 to 0.25 micrometers is subject to artifacts of measurement.

Figure 12:
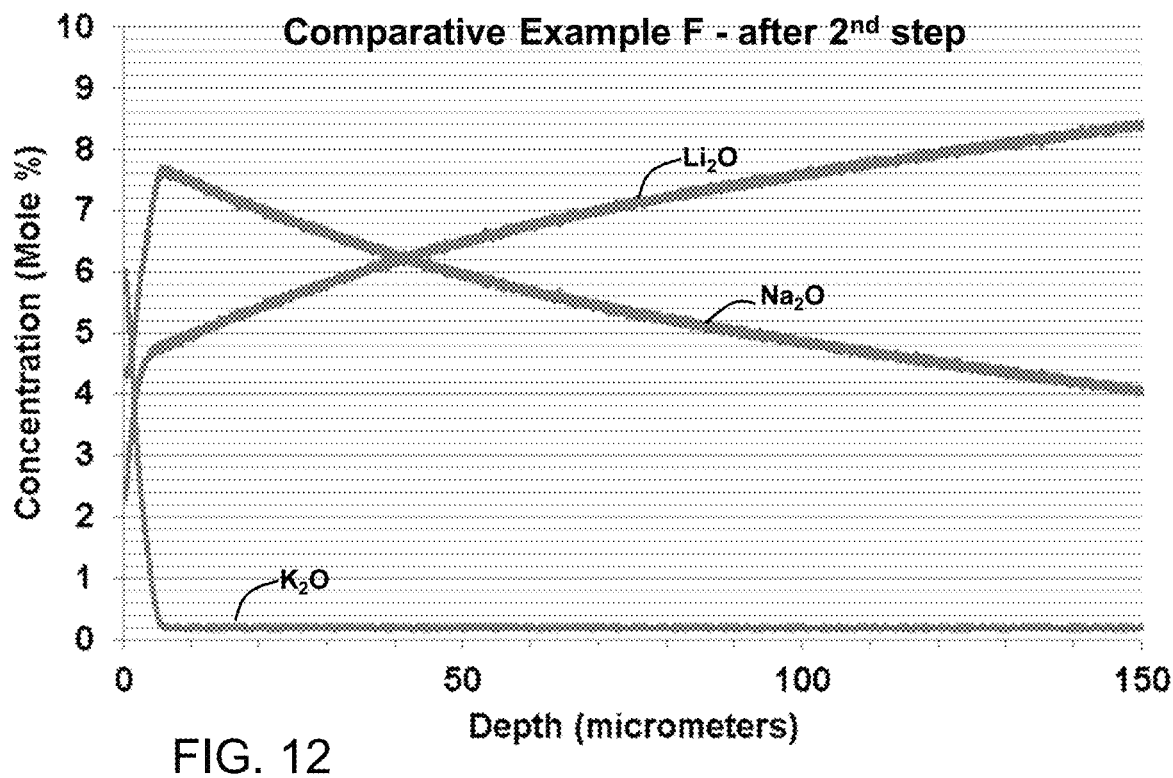
FIGS. 12-13 are graphs of oxide molar concentration as a function of depth in in a glass article after a second IOX step from a first surface (0 micrometers) for a comparative example.
Figure 13:
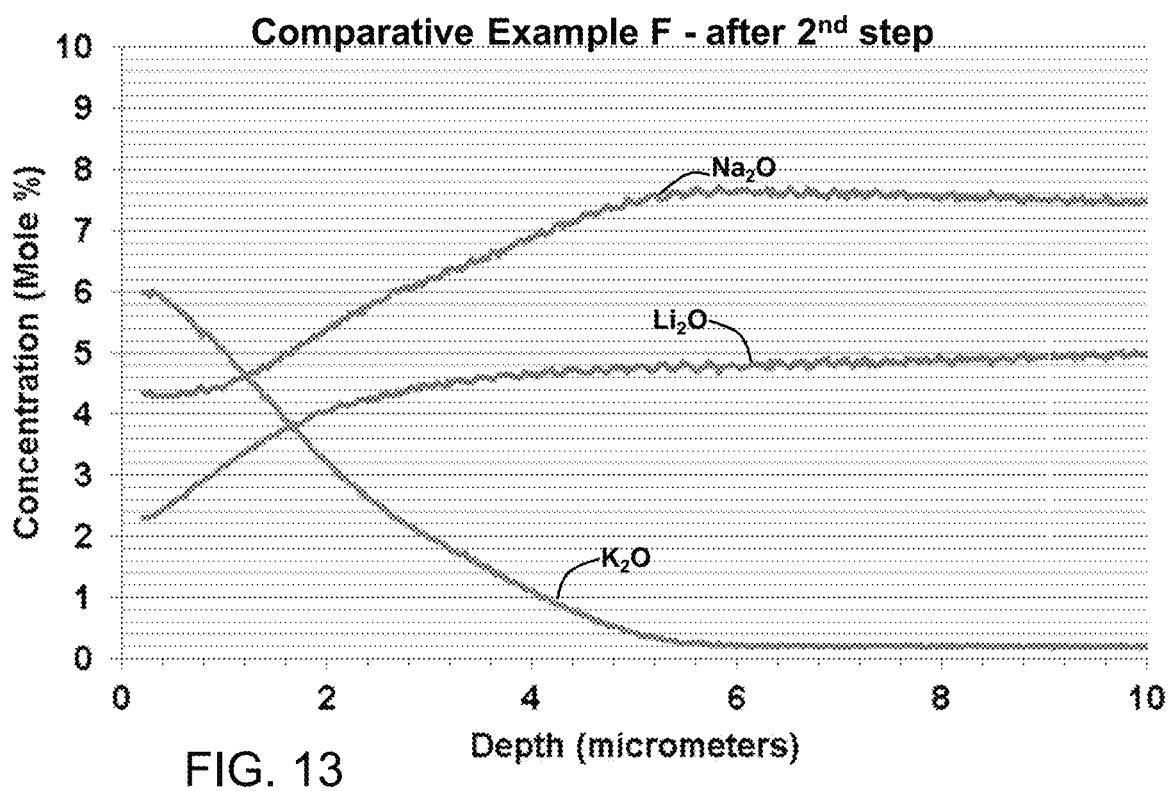

FIGS. 12-13 provide GDOES elemental profiles of oxide molar concentration as a function of depth in the glass article from a first surface (0 micrometers) for Comparative Example F after the $2^{nd}$ IOX step (96 wt % K/4 wt % Na, 450° C., 0.5 hours). FIG. 12 shows the profile to a depth of 150 micrometers. FIG. 13 shows the profile of FIG. 12 to a depth of 10 micrometers, which includes details of the spike region. The data from 0 to 0.25 micrometers is subject to artifacts of measurement.

In FIG. 12, the potassium spike ($DOL_K$) and the spike depth ($DOL_{spike}$) were located at 5.7 micrometers. In no portion of the spike region did a concentration of the lithium exceed a concentration of the sodium. In the post-spike near region, e.g., from greater than or equal to 6.8 micrometers to less than or equal to 11.4 micrometers, molar concentration of ions of sodium were much larger (by 2 mol % or more) as compared to the ions of lithium.

In FIG. 13, the area of analysis is magnified, to include details of the spike region (to 5.7 micrometers) and the post-spike near region (e.g., from about greater than or equal to 6.8 micrometers to less than or equal to 11.4 micrometers). In this spike area, unlike Example 1, the potassium of the spike preferentially exchanged with the lithium, which led to traditional concentration gradients in the molar oxide concentration in the spike region for lithium and sodium.

At all positions in the spike region and the post-spike near region, the amount of lithium oxide was less than the amount of sodium oxide, which reflects a very low amount of lithium in the first bath of the IOX process.

In FIG. 13, the averages of measured concentration values over the distance from 0.5 micrometers to 1 micrometers, to represent the ratio just below the surface, were: 4.38 for $Na_2O$ mol % and 2.85 for $Li_2O$ mol %. The resulting molar ratio of sodium dioxide ($Na_2O$) to lithium dioxide ($Li_2O$) just below the surface was 1.54. Also in FIG. 13, the averages of measured concentration values over the distance from 6.8 micrometers to 11.4 micrometers were: 7.50 for $Na_2O$ mol % and 4.93 for $Li_2O$ mol %. The resulting molar ratio of sodium dioxide ($Na_2O$) to lithium dioxide ($Li_2O$) in the post-spike near region was 1.52. Further in FIG. 13, the averages of measured concentration values for depths of less than or equal to 0.4 micrometers: 7.30 for $K_2O$ mol % and 2.92 for $Na_2O$ mol %. The resulting molar ratio of potassium dioxide ($K_2O$) to sodium dioxide ($Na_2O$) in this region was 2.50.

Drop Performance. Various inventive and comparative glasses were tested for drop performance. A controlled drop test, including multiple drops of glass, was performed using a phone-sized puck being dropped onto a 80 grit sand-paper (to simulate rough surfaces). Drop tests were performed under ambient conditions (air, room temperature). The first drop was performed at a starting height of 20 cm, which represented the distance from the exposed surface of a cover glass to the top of a drop surface. If no cover glass failure occurred on the 80 grit sand-paper, the drop height was increased by 10 cm, and the puck dropped again. The puck was sequentially dropped at 10 cm increments (e.g., 10 cm, then 20 cm, then 30 cm, etc.) until the cover glass failed.

Figure 14:
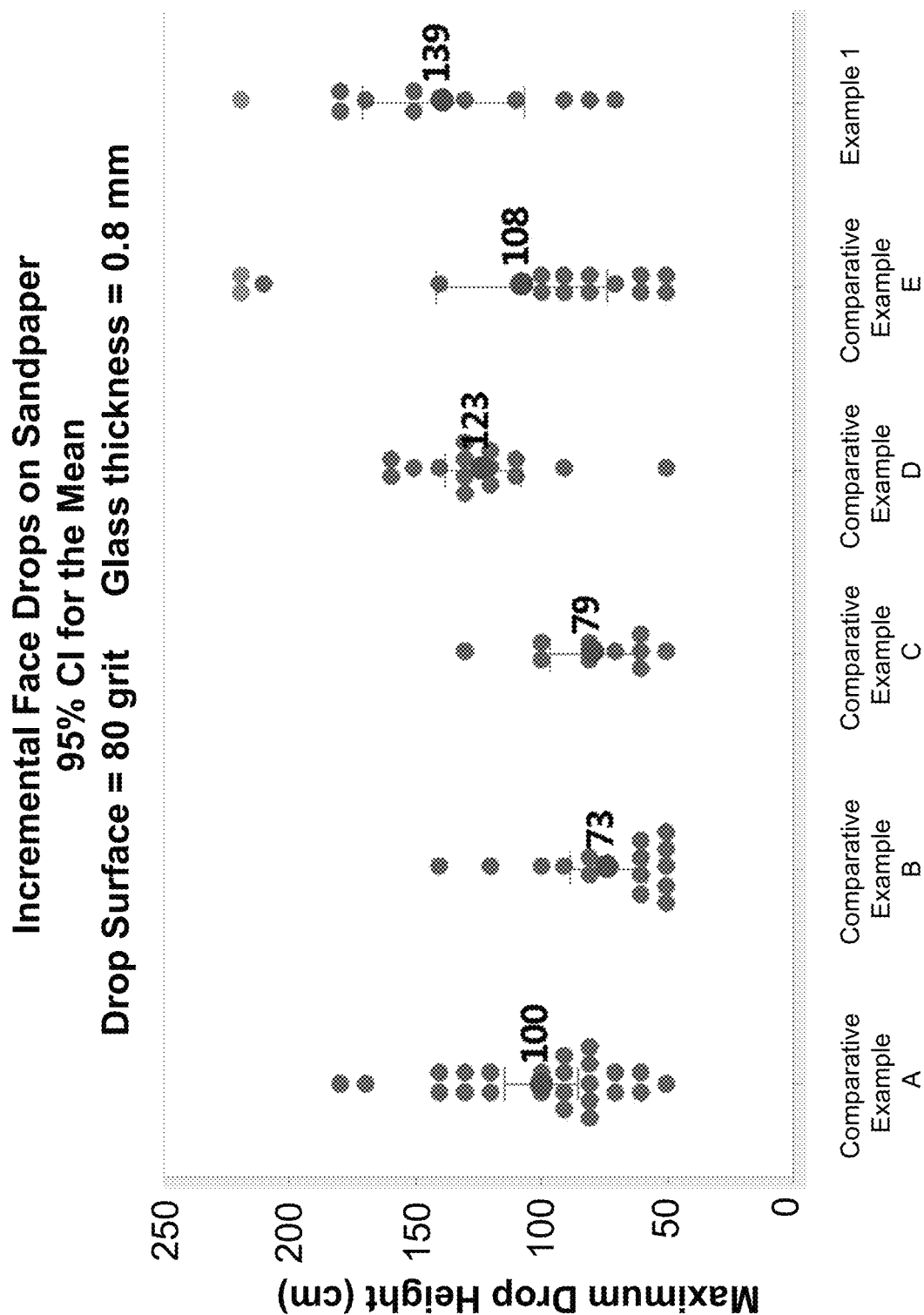
FIG. 14 is a plot of maximum drop height (cm) onto 80 grit for an embodiment and comparative examples.

FIG. 14 is a plot of results of the controlled-drop process, where height where cover glass failure occurred is provided. In FIG. 14, at 80 grit, performance of the inventive embodiment (Example 1) was better than Examples A-E (comparative).

Scratch Performance (Knoop scratch initiation threshold). Table 3A provides scratch data for Example 1, as conducted on a sample sized 130.2 mm×65.2 mm (0.8 mm thickness) and Example A (comparative), as conducted on a sample sized 50 mm×50 mm (0.8 mm thickness). Table 3B provides further scratch data for Example A (comparative), as conducted on a sample sized 50 mm×50 mm (0.8 mm thickness), and Example F (comparative), as conducted on a sample sized 130.2 mm×65.2 mm (0.8 mm thickness).

TABLE 3A

| Example | 5N | 8N | Depth of Compression (DOC) |
|---|---|---|---|
| 1 | Some Lateral cracking present | Some Lateral cracking present | 171 micrometers (21.4% of thickness) |
| A (comparative) | Some Lateral cracking present | Lateral cracking present | — |

TABLE 3B

| Example | 5N | 8N | 1-8N Ramped |
|---|---|---|---|
| A (comparative) | NO cracking | Lateral cracking present | Some Lateral cracking present |
| F (comparative) | Some Lateral cracking present | Lateral cracking present | Lateral cracking present |

Table 3A shows that at 5N, some lateral cracking appeared on the glass article for a single IOX exchange method used for Example A (comparative), using potassium and sodium for IOX exchange, and no lithium was present in the ion exchange bath. Increasing the load to 8N resulted in more lateral cracking on the glass article relative to the 5N test. For Example 1, using an inventive dual IOX exchange method, including 30% lithium in the first step, at 5N, the scratch performance was about the same as that for Example A (comparative); and at 8N, the scratch performance was significantly improved, while keeping the surface compressive stress at a high level around 830 MPa. The surface compressive stress of Comparative Example A was 710 MPa.

Table 3B shows that at 5N, no lateral cracking appeared on the glass article for the single IOX exchange method used for Example A (comparative); increasing the load to 8N resulted in more lateral cracking on the glass article relative to the 5N test; and for the 1-8N ramped load, there was some lateral cracking. For Example F (comparative), which was exposed to a DIOX exchange method that resulted in traditional concentration gradients in the molar oxide concentration in the spike region for lithium and sodium, there was some cracking at 5N and more cracking at 8N and during the 1-8N ramped load. The surface compressive stress of Comparative Example F was 698 MPa.

Figure 15:
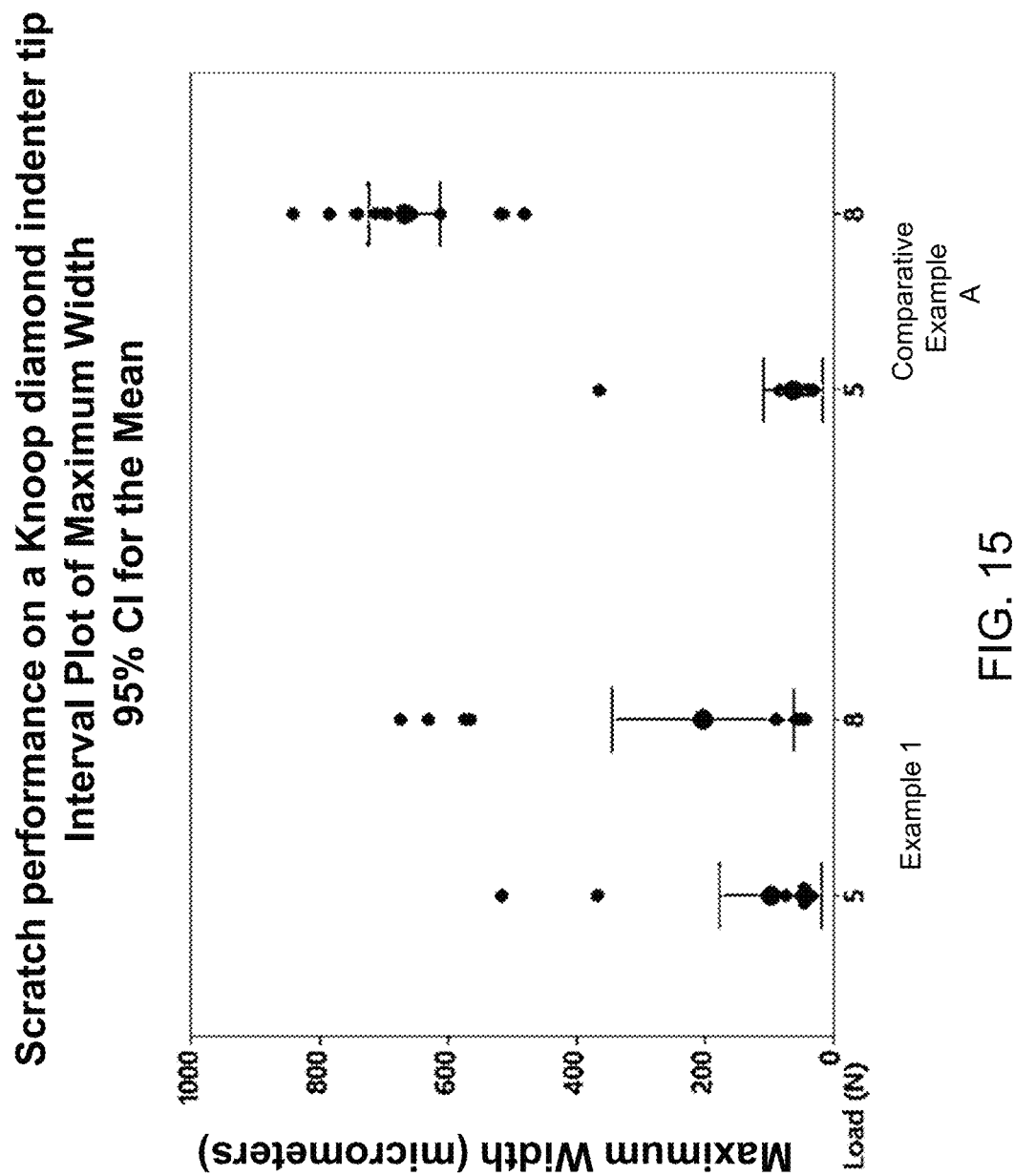
FIG. 15 is a plot of maximum width of scratch (micrometers) for an embodiment and a comparative example at 5N and at 8N.

FIG. 15 is a plot of maximum width of scratch (micrometers) for Example 1 and Example A (comparative) at 5N and at 8N. Scratch performance at 5N is about the same for both Example 1 and Example A (comparative); at 8N, Example 1 showed a lower maximum scratch width.

Figure 16:
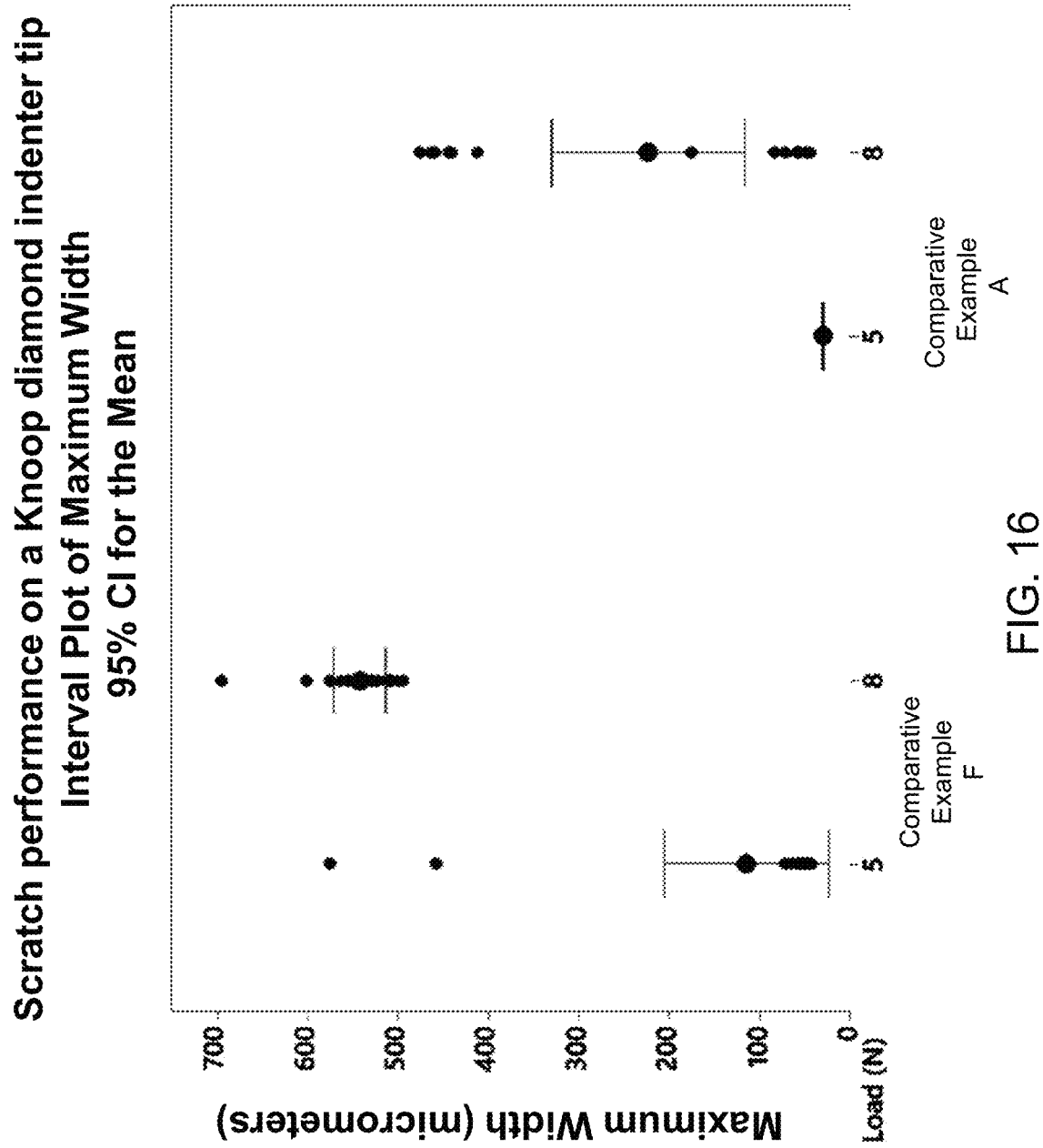
FIG. 16 is a plot of maximum width of scratch (micrometers) for comparative examples at 5N and at 8N.

FIG. 16 is a plot of maximum width of scratch (micrometers) for Example A (comparative) and Example F (comparative) at 5N and at 8N. At both 5N and 8N, Example A showed a lower maximum scratch width as compared to Example F.

From this, it is generally concluded that stress profiles advantageous for scratch resistance have in a post-spike near region a $Li_2O$ mol % that is similar to or within ±1 mol % relative to the $Na_2O$ mol %. Moreover, a preferred average molar ratio of sodium dioxide ($Na_2O$) to lithium dioxide ($Li_2O$) is greater than or equal to 0.9 and/or less than or equal to 1.75 in the post-spike near region, including all values and ranges therebetween.

In some comparative embodiments, there is serious degradation in scratch performance in high-Li containing glasses as the surface stress is increased. The ion exchange techniques disclosed herein and resulting stress profiles allow for the formation of a stress profile that leads to simultaneously high damage resistance and high scratch resistance.

Example 18

An IOX bath-life study was conducted. The process used two separate IOX baths in a DIOX process. Lithium level was measured with Ion Chromatography (IC). The lithium level was expressed in the form of $LiNO_3$, weight percentage (wt %). The 1st IOX step was: 35 wt. % $NaNO_3$/35 wt. % $K_2NO_3$/30 wt. % $Li_2NO_3$/; 2nd IOX step was: 96K/4Na+ 0.07Li. IOX experiments were carried out as follows. For the 1st IOX step: a salt bath of 1 kg was prepared; for every IOX run, 5 samples according to Composition A in 50 mm×50 mm sized square were loaded into the bath. For the 2nd IOX step: a salt bath of 1 kg was prepared; for every IOX run, the same 5 samples from the 1st IOX step were loaded. There were 6 IOX runs conducted for each step. After the salt bath was prepared, a salt sample was collected; the other 6 salt samples were collected after every IOX run. Table 4 provides a summary of measured weight % lithium levels ($LiNO_3$) before IOX and after each run.

TABLE 4

| | $LiNO_3$ content (wt. %) | | | | | | |
|---|---|---|---|---|---|---|---|
| DIOX STEP | Before IOX | 1 | 2 | 3 | 4 | 5 | 6 |
| 1st | 29.91 | 29.98 | 29.92 | 29.68 | 29.73 | 29.86 | 29.66 |
| 2nd | 0.071 | 0.120 | 0.176 | 0.230 | 0.264 | 0.318 | 0.366 |

From Table 4, it is concluded that the first step IOX bath had an essentially infinite, or semi-infinite, lifetime in that the lithium nitrate level was stabilized in the range between 29 wt. % and 30 wt. %. Without intending to be bound by theory, it is thought that the high concentration of lithium in the salt bath during the first IOX step meant that any lithium released from the glass substrate into the salt bath during the IOX did not result in a significant lithium concentration increase, thus any lithium released from glass substrate had a minimal effect on the total lithium concentration of the bath. Thus, the lithium poisoning effect on properties of the sample was also very small.

During the second step IOX bath, lithium levels increased. Without intending to be bound by theory, the second step salt did not have a high lithium preloading, which meant that the lithium poisoning effect could be more detectable.

Table 5 provides measured compressive stress (CS) in MPa for the samples of Table 4.

TABLE 5

| | CS (MPa) | | | | | |
|---|---|---|---|---|---|---|
| DIOX STEP | 1 | 2 | 3 | 4 | 5 | 6 |
| 1st | 103.0 | 95.1 | 95.1 | 103.0 | 99.1 | 111.0 |
| 2nd | 823.5 | 816.2 | 802.7 | 799.4 | 793.8 | 789.3 |

As shown in Table 5, the CS did not significantly change. This is because of the stable salt chemistry during the first IOX step and minimal Li poisoning. As for the second IOX step, the CS decreased. Without intending to be bound by any particular theory, the decreasing trend in CS is likely due to a lithium poisoning effect.

Based on the information in Tables 4-5, the DIOX recipe designed for glass composition A resulted in efficiencies in IOX bath life and raw material utilization better than glass composition B. An advantage of the DIOX method as described is that the first IOX salt can run for almost infinite time with this recipe, and the second bath showed a better salt life and efficiency. The CS for glass composition A decreased more slowly than the CS for glass composition B. Thus, the DIOX recipe is very promising in terms of tank management benefits.

All compositional components, relationships, and ratios described in this specification are provided in mol % unless otherwise stated. All ranges disclosed in this specification include any and all ranges and subranges encompassed by the broadly disclosed ranges whether or not explicitly stated before or after a range is disclosed.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A glass-based article comprising:
   a lithium aluminosilicate composition;
   a molar ratio of sodium oxide ($Na_2O$) to lithium oxide ($Li_2O$) that is less than or equal to 0.9 at the center of the glass-based article;
   a thickness t; and
   a stress profile comprising:
      a spike region extending from the first surface to a knee at a spike depth of layer ($DOL_{spike}$); and
      a tail region extending from the knee to a center of the glass-based article, wherein within the tail region there is a post-spike near region;
   wherein a molar ratio of sodium dioxide ($Na_2O$) to lithium dioxide ($Li_2O$) in the post-spike near region is greater than or equal to 0.9.

2. The glass-based article of claim 1, wherein the post-spike near region is located over a distance that is deeper than the knee by from 20 to 100% of the $DOL_{spike}$.

3. The glass-based article of claim 1, wherein the molar ratio of sodium dioxide (Na$_2$O) to lithium dioxide (Li$_2$O) in the post-spike near region is averaged over the distance that is deeper than the knee by from 20 to 100% of the DOL$_{spike}$.

4. The glass-based article of claim 1, wherein the molar ratio of sodium dioxide (Na$_2$O) to lithium dioxide (Li$_2$O) in the post-spike near region is averaged over a depth of from 6 micrometers to 10 micrometers.

5. The glass-based article of claim 1, wherein in the post-spike near region the molar ratio of sodium dioxide (Na$_2$O) to lithium dioxide (Li$_2$O) is less than 1.5.

6. The glass-based article of claim 1 further comprising a stress profile comprising:
 a maximum compressive stress (CS$_{max}$) greater than or equal to 650 MPa;
 a depth of compression (DOC) that is greater than or equal to 0.19·t; and
 a peak central tension (CT) in a tensile region.

7. The glass-based article of claim 6, wherein the stress profile further comprises:
 a spike region extending from the first surface to a knee at a spike depth of layer (DOL$_k$); and
 wherein a compressive stress at the knee (CS$_k$) is greater than or equal to 100 MPa.

8. The glass-based article of claim 6, wherein the stress profile further comprises: a negative curvature region, wherein a second derivative of stress as a function of depth is negative.

9. The glass-based article of claim 8, wherein a maximum absolute value of an average of the second derivative in the range of 0.03·t to 0.175·t is greater than or equal to 0.0001 MPa/µm$^2$.

10. The glass-based article of claim 1, comprising a Knoop scratch initiation threshold of greater than or equal to 5 N.

11. The glass-based article of claim 10, wherein an average width at a center of scratches at 8 N of scratch testing with a Knoop geometry diamond tip and a rate of 9.34 mm/min is less than or equal to 600 micrometers after 10 scratches.

12. A consumer electronic product comprising:
 a housing having a front surface, a back surface, and side surfaces;
 electrical components provided at least partially within the housing, the electrical components including at least a controller, a memory, and a display, the display being provided at or adjacent the front surface of the housing; and
 a cover disposed over the display;
 wherein at least a portion of at least one of the housing or the cover comprises the glass-based article of claim 1.

13. A method of manufacturing a glass-based article comprising:
 exposing a glass-based substrate having opposing first and second surfaces defining a substrate thickness (t) and having a lithium aluminosilicate composition to an ion exchange treatment to form the glass-based article having a lithium aluminosilicate composition and a stress profile comprising: a spike region extending from the first surface to a knee at a spike depth of layer (DOL$_{spike}$); and a tail region extending from the knee to a center of the glass-based article, wherein within the tail region there is a post-spike near region, the ion exchange treatment comprising:
 a first molten salt bath comprising a potassium salt, a sodium salt, and a lithium salt, wherein a concentration of the lithium salt is in the range of greater than or equal to 15 weight % to less than or equal to 50 weight %; and
 a second molten salt bath comprising a potassium salt, a sodium salt, and a lithium salt, wherein a concentration of the lithium salt is in the range of greater than or equal to 0 weight % to less than or equal to 1 weight %;
 wherein the glass-based article comprises a molar ratio of sodium oxide (Na$_2$O) to lithium oxide (Li$_2$O) that is less than or equal to 0.9 at the center of the glass-based article; and
 wherein the glass-based article comprises a molar ratio of sodium dioxide (Na$_2$O) to lithium dioxide (Li$_2$O) in the post-spike near region that is greater than or equal to 0.9.

14. The method of claim 13, wherein the post-spike near region is located over a distance that is deeper than the knee by from 20 to 100% of the DOL$_{spike}$.

15. The method of claim 13, wherein the molar ratio of sodium dioxide (Na$_2$O) to lithium dioxide (Li$_2$O) in the post-spike near region is averaged over the distance that is deeper than the knee by from 20 to 100% of the DOL$_{spike}$.

16. The method of claim 13, wherein the molar ratio of sodium dioxide (Na$_2$O) to lithium dioxide (Li$_2$O) in the post-spike near region is averaged over a depth of from 6 micrometers to 10 micrometers.

17. The method of claim 13, wherein in the post-spike near region the molar ratio of sodium dioxide (Na$_2$O) to lithium dioxide (Li$_2$O) is less than 1.5.

18. The method of claim 13, wherein:
 the first molten salt bath comprises a concentration of the potassium salt in the range of greater than or equal to 30 weight % to less than or equal to 40 weight %, a concentration of the sodium salt in the range of greater than or equal to 30 weight % to less than or equal to 40 weight %, and the concentration of the lithium salt is in the range of greater than or equal to 25 weight % to less than or equal to 35 weight %, with the proviso that the concentrations of the potassium salt, the sodium salt, and the lithium salt in the first molten bath total 100%, and
 the second molten salt bath comprises a concentration of the potassium salt in the range of greater than or equal to 95 weight % to less than or equal to 99 weight %, a concentration of the sodium salt in the range of greater than or equal to 0 weight % to less than or equal to 5 weight %, and the concentration of the lithium salt is in the range of greater than or equal to 0.1 weight % to less than or equal to 1 weight %, with the proviso that the concentrations of the potassium salt, the sodium salt, and the lithium salt in the second molten bath total 100%.

19. The method of claim 13, wherein the stress profile further comprises:
 a maximum compressive stress (CS$_{max}$) greater than or equal to 650 MPa,
 a depth of compression (DOC) that is greater than or equal to 0.19·t, and
 a peak central tension (CT) in a tensile region.

* * * * *